US010193429B2

(12) United States Patent
Smith et al.

(10) Patent No.: US 10,193,429 B2
(45) Date of Patent: *Jan. 29, 2019

(54) AIR GAP CONTROL SYSTEMS AND METHODS

(71) Applicant: Boulder Wind Power, Inc., Lousiville, CO (US)

(72) Inventors: James S. Smith, Lyons, CO (US); Matthew B. Jore, Ronan, MT (US); Michael A. Kvam, Polson, MT (US); David Samsel, Missoula, MT (US); Charles Perry Butterfield, Jr., Boulder, CO (US); Brian J. Sullivan, Boulder, CO (US); James David Duford, Polson, MT (US)

(73) Assignee: Boulder Wind Power, Inc., Louisville, CO (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/332,627

(22) Filed: Oct. 24, 2016

(65) Prior Publication Data

US 2017/0040878 A1 Feb. 9, 2017

Related U.S. Application Data

(63) Continuation of application No. 13/733,457, filed on Jan. 3, 2013, now Pat. No. 9,479,038, which is a
(Continued)

(51) Int. Cl.
*H02P 25/00* (2006.01)
*H02K 21/02* (2006.01)
(Continued)

(52) U.S. Cl.
CPC ............. *H02K 21/026* (2013.01); *H02K 7/08* (2013.01); *H02K 7/09* (2013.01); *H02K 21/12* (2013.01);
(Continued)

(58) Field of Classification Search
CPC ........ H02K 29/00; H02K 29/06; H02K 29/12; H02P 6/14
(Continued)

(56) References Cited

U.S. PATENT DOCUMENTS 3,233,950 A 2/1966 Baermann
3,614,181 A 10/1971 Meeks
(Continued)

FOREIGN PATENT DOCUMENTS

DE 10 2009 017839 10/2010
EP 1607583 12/2005
(Continued)

OTHER PUBLICATIONS

Examination Report for European Patent Application No. 12719143.5, dated Mar. 5, 2015.
(Continued)

*Primary Examiner* — Bickey Dhakal
*Assistant Examiner* — Gabriel Agared
(74) *Attorney, Agent, or Firm* — Cooley LLP

(57) ABSTRACT

In one embodiment, an apparatus includes a first member that supports a magnetic flux carrying member and a second member that supports a magnetic flux generating member disposed for movement relative to the first member. An air gap control system is coupled to at least one of the first member or the second member and includes an air gap control device that is separate from a primary magnetic flux circuit formed between the first member and the second member. The air gap control device is configured to exert a force on one of the first and second members in response to movement of the other of the first and second members in a direction that reduces a distance between the first and second members to maintain a minimum distance between the first
(Continued)

and second members and/or substantially center the one of the first and second members within the other.

12 Claims, 28 Drawing Sheets

Related U.S. Application Data continuation of application No. 13/445,206, filed on Apr. 12, 2012, now Pat. No. 8,362,731, and a continuation-in-part of application No. 13/152,164, filed on Jun. 2, 2011, now Pat. No. 9,154,024.

(60) Provisional application No. 61/517,040, filed on Apr. 12, 2011, provisional application No. 61/350,850, filed on Jun. 2, 2010.

(51) Int. Cl.
*H02K 7/09* (2006.01)
*H02K 21/12* (2006.01)
*H02K 41/03* (2006.01)
*H02P 25/024* (2016.01)
*H02K 7/08* (2006.01)

(52) U.S. Cl.
CPC ......... *H02K 41/031* (2013.01); *H02P 25/024* (2016.02); *H02K 2201/03* (2013.01); *H02K 2213/09* (2013.01)

(58) Field of Classification Search
USPC .................................................. 318/400.41
See application file for complete search history.

(56) References Cited

U.S. PATENT DOCUMENTS

| | | | |
|---|---|---|---|
| 4,055,123 A | 10/1977 | Heidelberg | |
| 4,793,263 A | 12/1988 | Basic et al. | |
| 5,608,196 A | 3/1997 | Hall et al. | |
| 5,610,463 A | 3/1997 | Dunfield et al. | |
| 5,619,083 A | 4/1997 | Dunfield et al. | |
| 6,362,554 B1 | 3/2002 | Neal | |
| 6,566,783 B2 | 5/2003 | Hatz et al. | |
| 6,727,630 B1 | 4/2004 | Maslov et al. | |
| 6,781,276 B1 | 8/2004 | Stiesdal et al. | |
| 6,791,222 B1 | 9/2004 | Maslov et al. | |
| 6,911,741 B2 | 6/2005 | Pettersen et al. | |
| 7,004,724 B2 | 2/2006 | Pierce et al. | |
| 7,011,598 B2 | 3/2006 | Flamang et al. | |
| 7,109,625 B1 | 9/2006 | Jore et al. | |
| 7,180,204 B2 | 2/2007 | Grant et al. | |
| 7,205,678 B2 | 4/2007 | Casazza et al. | |
| 7,246,991 B2 | 7/2007 | Bosche | |
| 7,385,306 B2 | 6/2008 | Casazza et al. | |
| 7,410,123 B2 | 8/2008 | Nunnally | |
| 7,456,534 B2 | 11/2008 | Engstrom | |
| 7,581,921 B2 | 9/2009 | Bagepalli et al. | |
| 7,656,135 B2* | 2/2010 | Schram ............... | F03D 7/02 322/59 |
| 7,687,932 B2 | 3/2010 | Casazza et al. | |
| 7,755,244 B2 | 7/2010 | Ley et al. | |
| 7,854,198 B2 | 12/2010 | Groening et al. | |
| 7,888,904 B2 | 2/2011 | Mularcik | |
| 7,893,555 B2 | 2/2011 | Casazza et al. | |
| 8,040,011 B2 | 10/2011 | Mueller et al. | |
| 8,178,992 B1 | 5/2012 | Meller | |
| 8,362,731 B2 | 1/2013 | Smith et al. | |
| 9,479,038 B2 | 10/2016 | Smith et al. | |
| 2003/0155829 A1 | 8/2003 | McMullen et al. | |
| 2004/0069901 A1 | 4/2004 | Nunnally | |
| 2005/0200223 A1 | 9/2005 | Tajima et al. | |
| 2007/0052312 A1* | 3/2007 | Stanetskiy ............ | H02K 53/00 310/152 |
| 2008/0292467 A1 | 11/2008 | Borgen | |
| 2009/0015020 A1 | 1/2009 | Stiesdal | |
| 2010/0253272 A1 | 10/2010 | Stiesdal et al. | |
| 2011/0291413 A1 | 12/2011 | Wamble, III et al. | |
| 2011/0298310 A1 | 12/2011 | Ross et al. | |
| 2012/0217831 A1 | 8/2012 | Jore et al. | |
| 2013/0119802 A1 | 5/2013 | Smith et al. | |

FOREIGN PATENT DOCUMENTS

| | | |
|---|---|---|
| EP | 1684399 | 7/2006 |
| EP | 2237398 | 10/2010 |
| EP | 2697893 | 1/2016 |
| GB | 1129290 | 10/1968 |
| JP | 59-122361 | 7/1984 |
| KR | 10-2009-0066369 | 6/2009 |
| WO | WO 01/94779 | 12/2001 |
| WO | WO 2002/033254 | 4/2002 |
| WO | WO 2007/043894 | 4/2007 |
| WO | WO 2010/083054 | 7/2010 |
| WO | WO 2012/059109 | 5/2012 |
| WO | WO 2012/092964 | 7/2012 |
| WO | WO 2012/092965 | 7/2012 |
| WO | WO 2012/092967 | 7/2012 |

OTHER PUBLICATIONS

Office Action for Chinese Patent Application No. 201280026020, dated Sep. 14, 2015.
Office Action for U.S. Appl. No. 13/445,206, dated Aug. 24, 2012.
International Search Report and Written Opinion for International Application No. PCT/US2012/033236, dated Apr. 9, 2013.
Office Action for U.S. Appl. No. 13/733,457, dated Jun. 30, 2015.
Office Action for U.S. Appl. No. 13/733,457, dated Nov. 13, 2015.
First Office Action issued by the Chinese Patent Office for Application No. 201610860633.9, dated May 16, 2018, 10 pages non-English and 10 pages English translation.

* cited by examiner

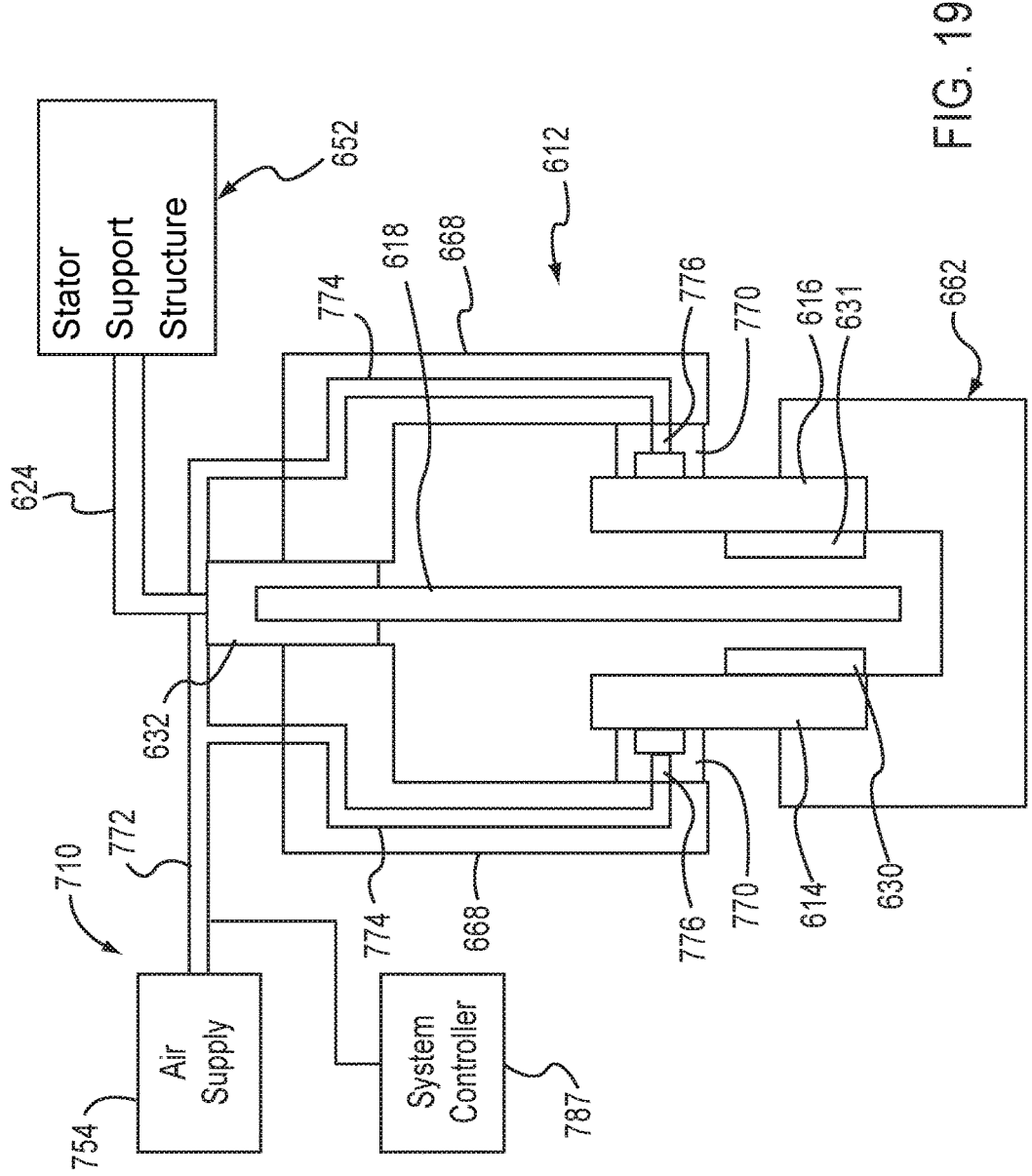

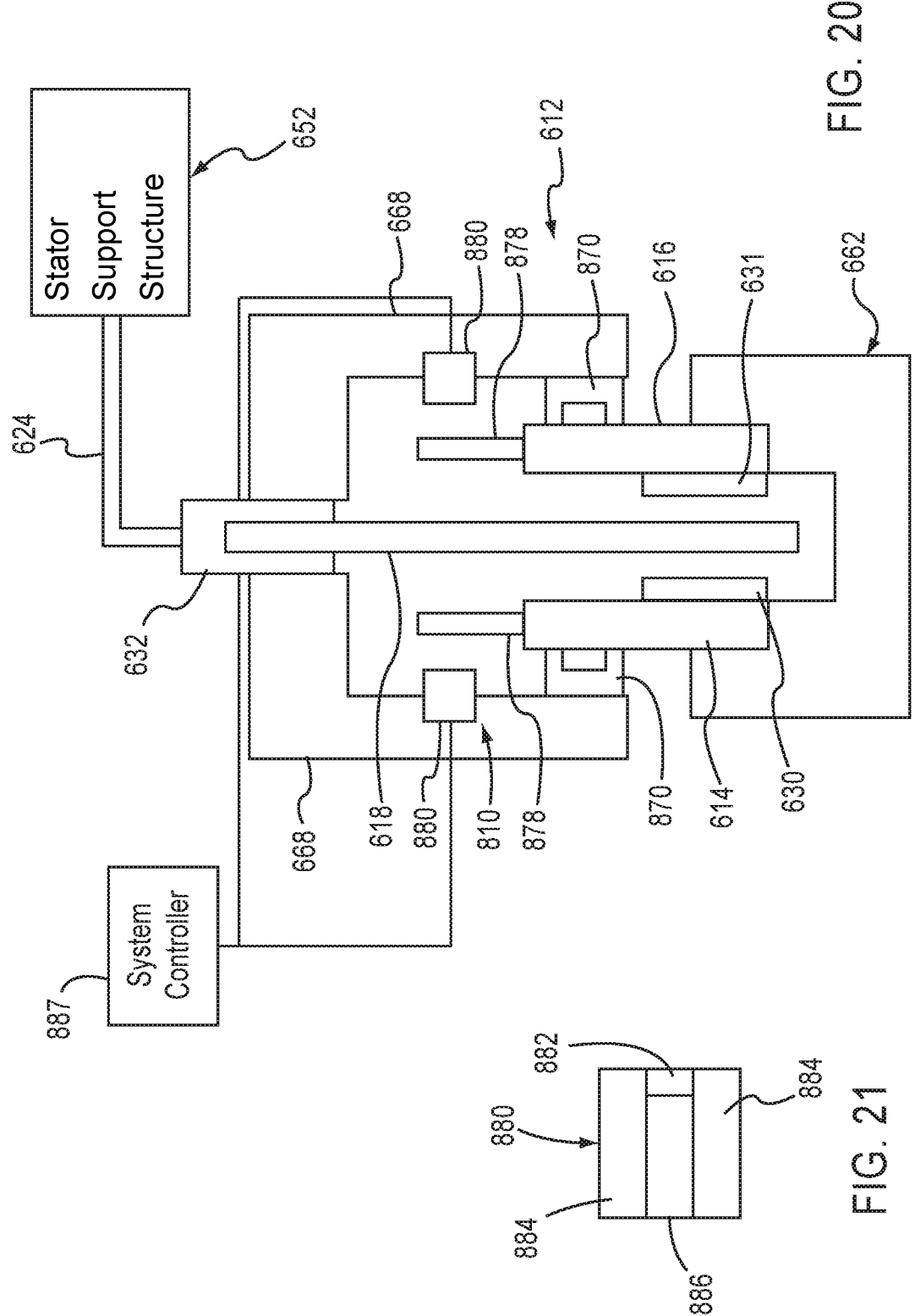

AIR GAP CONTROL SYSTEMS AND METHODS

PRIORITY

This application is a continuation of U.S. patent application Ser. No. 13/733,457, entitled "Air Gap Control Systems and Methods," filed Jan. 3, 2013, which is a continuation of U.S. patent application Ser. No. 13/445,206, entitled "Air Gap Control Systems and Methods," filed Apr. 12, 2012 (now U.S. Pat. No. 8,362,731), which claims priority to and the benefit of U.S. Provisional Application Ser. No. 61/517,040, entitled "Air Gap Control System," filed Apr. 12, 2011, each of the disclosures of which is incorporated herein by reference in its entirety. U.S. patent application Ser. No. 13/733,457 is also a continuation-in-part of U.S. patent application Ser. No. 13/152,164, entitled "Systems and Methods for Improved Direct Drive Generators," filed Jun. 2, 2011 (now U.S. Pat. No. 9,154,024), which claims priority to U.S. Provisional Application Ser. No. 61/350,850, entitled "Systems and Methods for Improved Direct Drive Generators," filed Jun. 2, 2010, and U.S. Provisional Application Ser. No. 61/517,040, entitled "Air Gap Control System," filed Apr. 12, 2011, each of the disclosures of which is incorporated herein by reference in its entirety.

FIELD OF THE INVENTION

Embodiments described herein relate to an air gap control system, and more particularly to an air gap control system for maintaining a minimum gap clearance in electromagnetic machines.

BACKGROUND OF INVENTION

Typical electromagnetic machines function by exposing electrically conductive windings in a stator to a magnetic field produced by magnets mounted on a turning rotor. The size of the air gap between the stator and the rotor is an important design variable, as the electromagnetic efficiency of such machines tends to improve as the air gap size is reduced. Maintaining a constant air gap size is also important, both to avoid a collision between the rotor and the stator and to avoid unwanted currents, flux effects, and other load-related losses caused by eccentricities in the air gap. Consistency in air gap size is typically achieved by ensuring that the machine's stator and rotor (and any supporting structure) are stiff enough to withstand expected outside forces during assembly and operation. Significant violations of air gap size, such as where the air gap is nearly closed or is closed altogether, can be dangerous or destructive to equipment and personnel, particularly if the air gap is compromised during operation of the electromagnetic machine.

As the size of an electromagnetic machine increases, dependence on structural stiffness to ensure that a minimum air gap clearance is maintained can become impractical due to the weight and cost of the required structure. A need exists, therefore, for alternative approaches for maintaining a constant air gap. A need also exists for providing such alternatives that would provide the necessary gap clearance at a relatively lower weight and cost compared to known conventional methods that include increasing structural stiffness.

SUMMARY

Illustrative embodiments that are shown in the drawings are summarized below. It is to be understood, however, that there is no intention to be limited to the forms described herein. One skilled in the art can recognize that there are numerous modifications, equivalents, and alternative constructions that fall within the spirit and scope of the inventions expressed in the claims. In particular, one skilled in the art can recognize that the embodiments described herein are applicable to any machine with alternating polarity arrays of magnets, including radial, axial, and transverse flux motors and generators that operate in a rotating or a linear manner.

In one embodiment, an apparatus includes a first member that supports a magnetic flux carrying member and a second member that supports a magnetic flux generating member. The second member is disposed for movement relative to the first member. An air gap control system that includes an air gap control device is coupled to at least one of the first member or the second member. The air gap control system is configured to exert a force on one of the first member and the second member in response to movement of the other of the first member and the second member in a direction that reduces a distance between the first member and the second member to one of maintain a minimum distance between the first member and the second member and substantially center the one of the first member and the second member within a region defined by the other of the first member and the second member. The air gap control device is separate from a primary magnetic flux circuit formed between the first member and the second member.

BRIEF DESCRIPTION OF THE DRAWINGS

FIG. 19 is a schematic illustration of an axial rotor/stator assembly and a portion of an air gap control system, according to another embodiment.

FIG. 20 is a schematic illustration of a portion of an axial rotor/stator assembly and a portion of an air gap control system, according to another embodiment.

FIG. 21 is an enlarged view of a portion of the air gap control system of FIG. 20.

DETAILED DESCRIPTION

Figure 1:
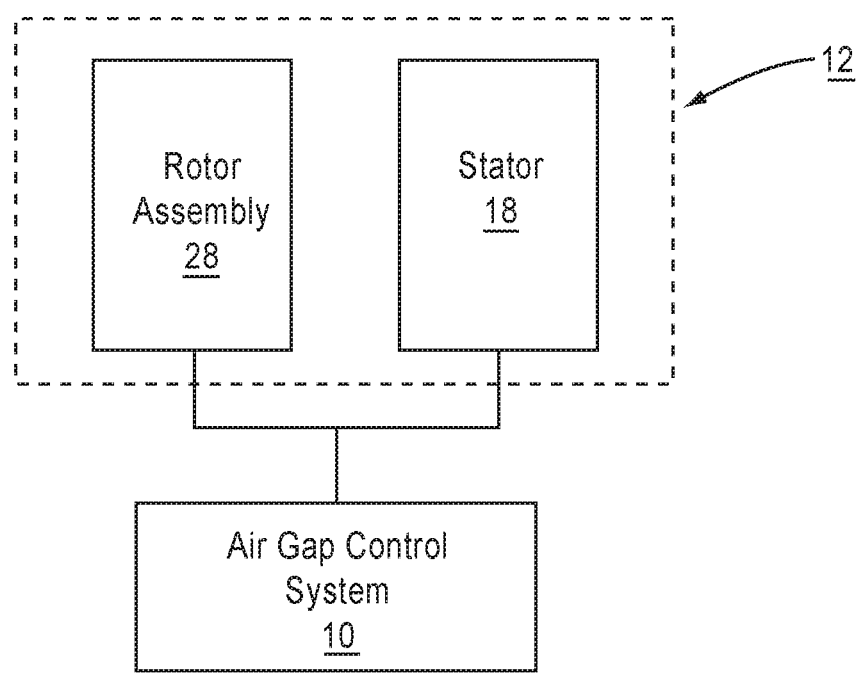
FIG. 1 is a schematic illustration of an air gap control system and a rotor/stator assembly according to an embodiment.

An air gap control system as described herein can be implemented in many applications where maintaining a constant gap is desired for machine performance and/or safe operation of the machine. In some embodiments, an air gap control system is described herein that can be used to maintain a clearance between the rotor assembly and stator by making one of the stator structure and the rotor structure relatively soft or compliant and the other of the stator structure and the rotor structure relatively stiff, and by transmitting a force from the stiff member to the compliant member to maintain a minimum gap clearance. When the stiff member is displaced or deflected, it transmits a force to the compliant member, causing the compliant member to deflect in a similar manner so as to maintain a constant or substantially constant gap size. The air gap control system can provide a locating stiffness between the rotor and stator, such that the air gap control stiffness becomes the dominant stiffness with respect to the relative motion between the stator and the rotor. For example, the air gap control system can function similarly to a spring of desired spring constant in that it can be used to produce a desired structural stiffness at a localized point between, for example, a rotor and a stator. In some embodiments, the air gap control system provides localized stiffness between a relatively soft component and a relatively stiff component of a machine or mechanism. Additionally, the stiffness between a relatively soft component and a relatively stiff component of the air gap control system can be distributed over a broader surface area of interaction between the two components if this arrangement proves more adaptable to the dynamic responses of the system components.

Some embodiments of an air gap control system described herein can be used to maintain an air gap within a required limit for performance and/or safety, such as in radial, axial, and transverse flux motors or generators, operating in a rotating manner or in a linear manner. Some embodiments of an air gap control system described herein can be useful for reducing the weight and cost of machines utilizing an air gap, and for reducing the required frequency and scope of maintenance over conventional air gap machines.

Although most of the embodiments described herein focus on implementations including permanent magnets in rotating, linear or reciprocating electric machines, it should be clear to the artisan that such electric machines can be designed and built using other than permanent magnets as the excitation means for the primary energy conversion electromagnetic circuit design. For example, wound field synchronous, induction, switched reluctance, etc. machine types can benefit in the same or similar manner from the air gap control systems described herein for permanent magnet machines. This is because, at least in part, the air gap control system can be engineered to have little or no effect on the primary energy converting electromagnetic circuit during operation or activation of the air gap control system. Therefore, the use of the term "magnet" when referring to an electric machine type in the preceding and following text should not be construed to limit the embodiment being discussed to permanent magnet machines.

Electromagnetic machines, such as the rotor/stator assemblies described herein, utilize magnetic flux from magnets, such as permanent magnets or electromagnets, to convert mechanical energy to electrical energy or vice versa. Various types of electromagnetic machines are known, including axial flux machines, radial flux machines, and transverse flux machines, in which one component rotates about an axis or translates along an axis, either in a single direction or in two directions, e.g. reciprocating, with respect to another component. Such machines typically include windings to carry electric current through coils that interact with the flux from the magnets through relative movement between the magnets and the windings. In a common industrial application arrangement, permanent magnets, for example, are mounted for movement, e.g. on a rotor (or otherwise moving part) and the windings are mounted on a stationary part, such as a stator. Other configurations, typical for low power, inexpensive machines operated from a direct current source where the magnets are stationary and the machine's windings are part of the rotor (energized by a device known as a "commutator" with "brushes") are clearly also available, but will not be discussed in detail in the following text in the interest of brevity.

In an electric motor, for example, current is applied to the windings in the stator, causing the magnets (and therefore the rotor) to move relative to the windings, thus converting electrical energy into mechanical energy. In a generator, application of an external force to the generator's rotor causes the magnets to move relative to the windings, and the resulting generated voltage causes current to flow through the windings—thus converting mechanical energy into electrical energy. In an AC induction motor, the rotor is energized by electromagnetic induction produced by electromagnets that cause the rotor to move relative to the windings on the stator, which are connected directly to an AC power source and can create a rotating magnetic field when power is applied.

An air gap control system as described herein can be utilized in such electromagnetic machines, to control the air gap or distance between the moving part (e.g., the rotor) and the stationary part (e.g., the stator) to ensure proper operation of the machine. An air gap control system as described herein is separate from the main rotor-stator support feature of such electromagnetic machines, and can operate independently of a main bearing of, for example, a rotor/stator assembly. In addition, the air gap control system does not bear the load of the rotor/stator assembly; rather the rotor/stator assembly is supported by some other suitable load-bearing component such as, for example, a main bearing assembly of the rotor/stator assembly as described below. Although the embodiments described herein are described with reference to use within an electromagnetic machine (e.g., a rotor/stator assembly as described herein), it should be understood that the air gap control systems described herein can also be used within other machines or mechanisms where there is a need or desire to maintain a specified distance or gap between a stationary component and a component that can move relative to the stationary component. An air gap control system as described herein can also be beneficial for controlling and maintaining an air gap in an iron core stator system. In such systems, where the stator is formed of iron, the stator is attracted to the rotor and therefore a need to control the gap between the rotor and stator can be even greater than in an air core stator system as described herein with reference to specific embodiments.

In some embodiments, an air gap control system can be configured similar to a magnetic levitation train suspension system. For example, in such systems, magnetic levitation can be used to suspend, guide and/or propel a train from magnets. Similar magnetic forces can be used within a machine to control and maintain a gap between the moving component (e.g., rotor) and the stationary component (e.g., stator) of the machine.

As used herein, the term "air gap control device" can refer to a component of any of the embodiments of an air gap control system described herein. For example, an air gap control device can include a magnet (e.g. permanent magnet, electromagnet), an auxiliary winding, an air bearing, a guide rail, etc.

FIG. 1 is a schematic illustration of a rotor/stator assembly, according to an embodiment. The rotor/stator assembly is one example embodiment of an electromagnetic machine that can include an air gap control system that can be used to control a gap between a moving component and a stationary component of the electromagnetic machine. A rotor/stator assembly 12 can include a rotor assembly 28 and a stator 18. The rotor/stator assembly 12 can be incorporated within, for example, a machine such as, for example, an electric motor or an electric generator. The rotor assembly 28 can include one or more rotor portions that move relative to the stator 18. For example, in some embodiments, the rotor assembly 28 can include a rotor portion that rotates relative to the stator 18 (e.g., with the direction of flux from rotor to stator generally in the axial or radial direction). In some embodiments, the rotor assembly 28 can include a rotor portion that moves in a linear motion relative to the stator 18. The rotor assembly 28 (also referred to herein as a "magnet supporting member" or a "member supporting a magnetic flux generating member") can include or support one or more magnetic flux generating members, such as, for example, magnets (e.g., a magnet pole assembly, or array of magnets) or windings (each not shown in FIG. 1). The magnets can include, for example, an array of magnets and can be, for example, permanent magnets, electromagnets or a combination of both. For example, in an induction machine or wound field synchronous machine, the magnets are electromagnets. A winding can be, for example, as described below for stator 18.

The stator 18 (also referred to herein as a "winding supporting member" or a "member supporting a magnetic flux carrying member") can include or support, for example, air core types of stators without any ferromagnetic material to support the copper windings or conduct magnetic flux. An air core stator can include an annular array of stator segments (not shown) and one or more conductive windings (not shown) or one or more magnets (not shown). Each air core stator segment can include a printed circuit board sub-assembly (not shown), or another means known of structurally encapsulating the windings in non-ferromagnetic materials. In some embodiments, the printed circuit board sub assemblies can be similar to that described in U.S. Pat. No. 7,109,625 and International Application No. PCT/US2010/000112, each of the disclosures of which is incorporated herein by reference in its entirety. Some embodiments of an air gap control system (as described in more detail below) in machines with a stator 18 made of conventional iron-core construction are arranged similarly to the air core concept described above, but are sized to address the attractive forces between the ferromagnetic core material and the flux from the rotor and the resulting negative stiffness from a rotor dynamic perspective.

An air gap control system 10 can be coupled to the rotor assembly 28 and/or to the stator 18 and can be used to control one or more air gaps defined between the rotor assembly 28 and the stator 18 during operation of the rotor/stator assembly 12. An air gap as referred to herein can be, for example, a distance between two components such as a distance between a portion of the rotor assembly 28 and a portion of the stator 18. The air gap control system 10 can be embodied in a variety of different arrangements that are each configured to maintain a minimum air gap between the rotor assembly 28 and the stator and/or to provide a mechanism to maintain the stator 18 centered within a region defined by the rotor assembly 28. For example, if the rotor assembly is a one-sided rotor assembly as referred to herein (e.g., includes a single rotor portion as described herein), the air gap control system 10 can be configured to maintain a minimum distance between the rotor portion of the rotor assembly 28 and the stator 18. If the rotor assembly 28 is a two-sided rotor assembly as described herein (e.g., includes a first rotor portion on one side of the stator and a second rotor portion on the other side of the stator), the air gap control system 10 can be configured to maintain the stator 18 in a centered or substantially centered position between the first rotor portion and the second rotor portion of the rotor assembly 28. In an embodiment without the end support portion 53, the air gap control system 10 can also carry the magnetic attraction load of the system to maintain the first rotor portion 14 spaced apart from the second rotor portion 16.

Figure 2:
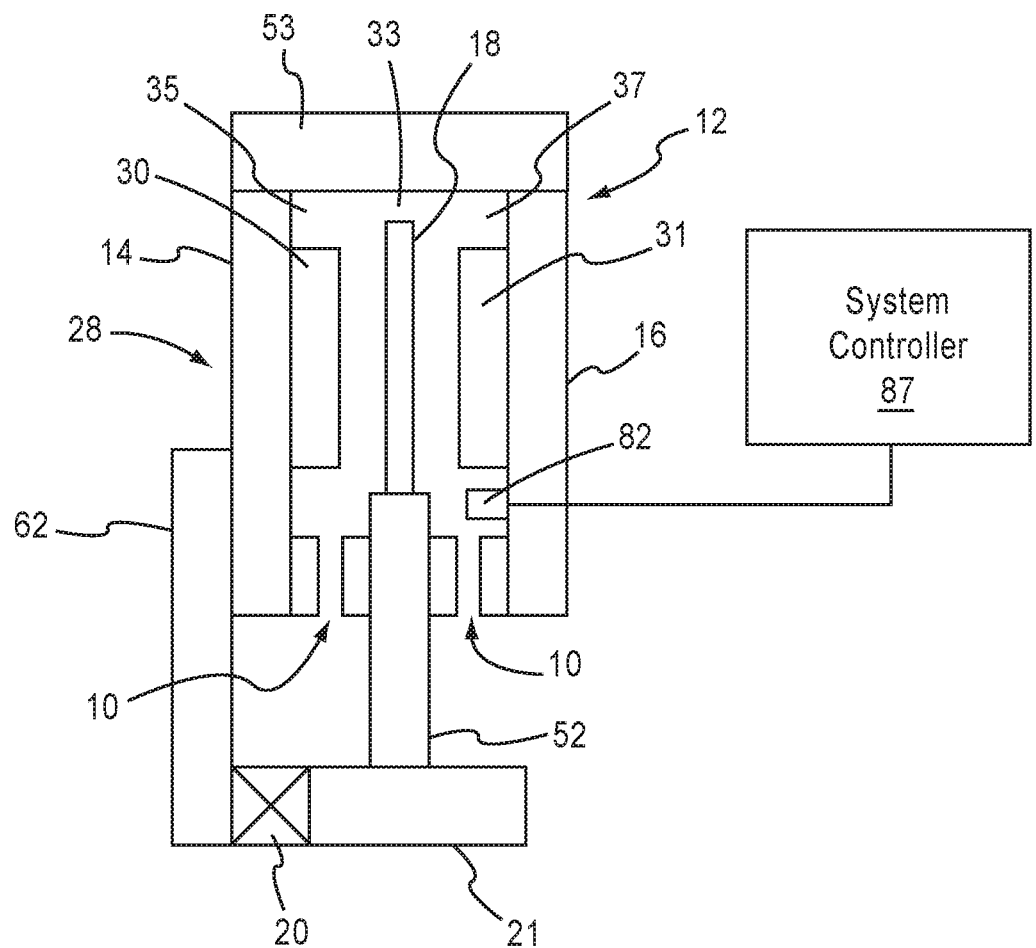
FIG. 2 is schematic illustration of a rotor/stator assembly and an air gap control system, according to an embodiment.

As shown in FIG. 2, the rotor/stator assembly 12 can include a stator support structure 52 that couples the stator 18 to a stationary stator hub 21. The stator support structure 52 can include one or more stator support members, a stator support clamp, and various other supporting components (the preceding components not shown in FIG. 2, for simplicity of illustration) depending on the particular embodiment. The stator 18 and/or one or more components of the stator support structure 52 can be relatively compliant or flexible to allow for the stator 18 to be deflected by a force exerted by the air gap control system 10, as described in more detail below. The rotor/stator assembly 12 also includes a rotor support structure 62 that couples the rotor assembly 28 to one or more bearings 20 that are coupled to the stationary stator hub 21. The rotor support structure 62 can include, for example, one or more rotor support members (not shown in FIG. 2) that can couple the rotor assembly 28 to the bearings 20. The rotor assembly 28 can also include an end support portion 53 that can separate the magnetic attraction loading within the system.

The bearings 20 can be, for example, a conventional bearing that can function to establish the general alignment, support (bears the weight of the rotor assembly 18), and provide general locating forces for rotor assembly 28 and stator 18, as well as general rotor dynamic stability of the rotating and stationary parts. The bearing 20 can be, for example, a hydrodynamic oil film, air, rolling element or magnetic bearing or other type of bearing known in the art. The air gap control system 10 can function independently of the main bearings 20 and can be used to establish the relative proximity of the rotating and stationary parts, for example, at the air gap between the rotor assembly 28 and the stator 18.

As shown in FIG. 2, in this example embodiment, the rotor assembly 28 includes a first rotor portion 14 and a second rotor portion 16 and the stator 18 can be disposed between the first rotor portion 14 and the second rotor portion 16. For example, the stator 18 can be disposed substantially centered between the first rotor portion 14 and the second rotor portion 16. The rotor assembly 28 also includes at least one magnet 30. In some embodiments, as shown in FIG. 2, the rotor assembly 28 can include a first magnet 30 coupled to or supported by the first rotor portion 14 and a second magnet 31 having an opposite polarity coupled to the second rotor portion 16. The magnets 30 and 31 can each include, for example, a magnet assembly or an array of magnets coupled to or supported by the rotor assembly 28. The magnets 30 and 31 can direct flux in an axial direction from the magnet poles on magnet 30 supported on the first rotor portion 14 to the magnet poles of magnet 31 supported on the second rotor portion 16.

A portion of the air gap control system 10 can be disposed between the first rotor portion 14 and the stator 18 or a portion of the stator support structure 52, such as for example, the stator support clamp or a stator support member. A portion of the air gap control system 10 can also be disposed between the second rotor portion 16 and the stator 18 or a portion of the stator support structure 52. In some embodiments, more than one air gap control system 10 can be utilized. For example, in some embodiments, the air gap control system 10 can be disposed as shown in FIG. 2, and a second air gap control system (not shown) can be disposed to control an air gap at another location, such as, for example, at locations 33, 35 and 37 shown in FIG. 2.

During operation of the rotor/stator assembly 12, if the stator 18 is deflected by movement of the rotor assembly 28, such as, for example, deflection of either first rotor portion 14 or second rotor portion 16, the air gap control assembly 10 can induce a centering force that acts to move or return the stator 18 to a nominally centered location between the first rotor portion 14 and the second rotor portion 16. For example, if first rotor portion 14 and/or second rotor portion 16 are deflected by external loading or inertial acceleration, air gap control assembly 10 can exert a force on stator 18 to cause stator 18 to maintain a nominal location, for example, centered within the rotor assembly 28 between first rotor portion 14 and second rotor portion 16. In another example, if stator 18 undergoes an axial translation relative to the rotor assembly 28 (e.g. because of an external force, whether temporary or constant, applied to first rotor portion 14 and/or second rotor portion 16 that deflects first rotor portion 14 and/or second rotor portion 16 in an axial direction), the gap distance on one side of stator 18 can increase and the gap distance on the other side of stator 18 can decrease. In response, air gap control system 10 can exert a force on stator 18 to re-center stator 18 between first rotor portion 14 and second rotor portion 16. In another example, if stator 18 undergoes an angular deflection relative to the rotor assembly 28 (such that in any given section of stator 18, the gap distance at the inner diameter of stator 18 is different than the gap distance at the outer diameter of stator 18), then air gap control system 10 can exert a moment on stator 18 that restores a uniform gap distance at some or all points between stator 18 and each of the first rotor portion 14 and the second rotor portion 16.

The above described embodiment describes the stator 18 as being compliant, but in alternative embodiments one or more rotors can be compliant relative to one or more stators. Regardless of the particular embodiment, an air gap control system 10 can be used to transmit a force from the relatively stiff member (e.g., the rotor assembly 28 in this example) to the relatively compliant member (e.g., the stator 18 in this example) so as to maintain a desired air gap between the stator 18 and the rotor assembly 28.

In some embodiments, the air gap control system 10 is an active system that includes a controllable force generating device (e.g., an electromagnet, an air bearing, auxiliary windings) and a system controller 87 (shown in FIG. 2) that can vary the applied force to the stator 18 based on input from a sensor 82, such as, for example, a proximity sensor or a back-emf detecting winding. Examples of such embodiments are described in detail below.

The air gap control system 10 can be implemented in many applications where maintaining a constant or substantially constant gap is desired for machine performance and/or safe operation of the machine. For example, the air gap control system 10 can be used with any machine with arrays of magnets, including radial, axial, and transverse flux motors and generators that operate in a rotating or a linear manner.

In some embodiments, the air gap control system 10 can include magnets to produce the force to move the stator 18 and maintain the air gap between the stator 18 and the rotor assembly 28 (e.g., the first rotor portion 14 and the second rotor portion 16). The magnets can be, for example, permanent magnets. The magnets can include one or more magnets and can be, for example, an array of magnets or a magnet assembly. In other embodiments, the magnets can be electromagnets as described below for an alternative embodiment. In some embodiments, a first magnet (not shown) having a polarity in a first direction can be disposed on the first rotor portion 14 and a second magnet (not shown) having a second polarity opposite the first polarity can be coupled to the stator 18 (or stator support structure 52) facing the first magnet. When the gap between the first magnet and the second magnet is decreased, for example, due to a deflection of the first rotor portion 14 as described above, a repulsive force between the first magnet and the second magnet will be increased. This increase in repulsive force will exert a force on the stator 18 to return the stator 18 to an equilibrium position (e.g., centered between the first rotor portion 14 and the second rotor portion 16 after the force causing the deflection is removed, or at a new, deflected position where the force causing the deflection and the repulsive force from the magnets described above arrive at a new equilibrium position. Similarly, the air gap control system 10 can include a third magnet (not shown) having a polarity in a third direction disposed on the second rotor portion 16 and a fourth magnet (not shown) having a fourth polarity opposite the third polarity coupled to the stator 18 (or the stator support structure 52) facing the third magnet. The third magnet and the fourth magnet can function in the same manner as the first magnet and the second magnet to exert a force on the stator 18 to control the air gap between the stator 18 and the first rotor portion 14 and the second rotor portion 16. An example of such an embodiment is described in more detail below.

In an alternative embodiment, the air gap control system 10 can include one or more guide rails (not shown) coupled to the first rotor portion 14 and the second rotor portion 16. In such an embodiment the guide rails are also coupled to a relatively stiff stationary outrigger (not shown) coupled to the stator support structure 52. In operation, when an external force causes an axial deflection of first rotor portion 14 or second rotor portion 16, that rotor portion (14 or 16) contacts the guide rail coupled to that rotor and applies a force to that guide rail. The force applied to the guide rail is then transmitted from the guide rail, through the stationary outrigger and to the stator support structure 52 where it causes the stator support member of the stator support structure 52 to limit or prevent further movement of the rotor portions 14, 16 and/or stator 18 and/or prevent contact between the rotor portions 14, 16 and stator 18, and can act to re-center the stator 18 between first rotor portion 14 and second rotor portion 16, thereby maintaining the necessary air gap clearance. An example of such an embodiment is described in more detail below.

In some such embodiments, in addition to the guide rails, the air gap control system 10 can include a pneumatic system coupled to the stationary outrigger, which can be used to form an air bearing at the guide rails to apply the force needed to re-position (e.g. re-center) the stator 18 without contact for most of the anticipated deflection loads. In some such embodiments, the air gap control system is a passive system. In such embodiments, the air bearings can balance the stiffness. In some such embodiments, the air gap control system is an active system. For example, the air gap control system can include a system controller 87 that can be used to control the flow rate of compressed air supplied to the air bearings based on input from a proximity sensor 82 or a mechanical lever, or in response to differential pressure changes caused by changes in the proximity between the air bearing and the mating surface, that are incorporated into the guide rail to control an air supply throttle valve to increase or decrease the air admitted to the air bearing based on the amount of force needed to resist further deflection. Examples of such alternative embodiments are described in more detail below.

In another alternative embodiment, in addition to, or as an alternative to, the guide rails, the air gap control system 10 can include an alternative embodiment of an active system to maintain the requisite air gap between the rotor assembly 28 and the stator 18. In such an embodiment, proximity sensors 82 can detect a decrease in the air gap distance between the rotor assembly 28 and the stator 18 and a system controller 87 can activate an electromagnet to create or increase a magnetic repulsion force between a rotor extension of the rotor assembly 28 having magnets or magnetic poles mounted thereto and the stationary outrigger. In an alternative embodiment, the system controller can be configured to activate an electromagnet to create a magnetic attractive force between the rotor extension and the stationary outrigger. In either instance, the force is transmitted through the intermediate components to the stator support structure 52, which can limit or prevent further movement of the rotor assembly 28 and/or stator 18 to prevent contact between the rotor assembly 28 and stator 18, and can act to re-center stator 18 within the rotor assembly 28 (e.g., between first rotor portion 14 and second rotor portion 16) and minimize variation of the air gap. After the controller determines that the air gap as measured by the proximity sensor has been restored to the desired distance, it deactivates or reduces the current through the electromagnet. The guide rails described above can optionally provide a mechanical backup in case of failure of the electromagnet. An example of such an embodiment of an air gap control system is described in more detail below.

In yet another alternative embodiment, the air gap control system 10 can utilize repulsive forces of one or more magnets to re-center or re-position the stator 18 in a similar manner as previously described. For example, an array of two or more magnets can be coupled to the stationary outrigger and an array of two or more magnets can be coupled to a rotor extension of the rotor assembly 28. The arrays of magnets can include a variety of different types, combinations and quantities of magnets. For example, the array of magnets on the stationary outrigger and/or the rotor extension can be permanent magnets, electromagnets and/or a combination thereof. In such an embodiment, the guide rails described above can optionally be included to provide a mechanical backup in case of failure of the magnet system. An example of such an embodiment of an air gap control system is described in more detail below.

In yet another embodiment, the air gap control system 10 can include the use of non-ferromagnetic brackets coupled to the rotor assembly 28 and non-ferromagnetic brackets coupled to the stator 18, together with annular rows of magnets coupled to the stator 18 to create a null flux ladder circuit. In such an embodiment, if the rotor assembly 28 is deflected by an external force, such that the annular rows of magnets are no longer centered over the null flux ladder circuit, the magnetic flux from the annular rows of magnets will cause current to flow through null flux ladder circuit, which in turn will generate a repulsive magnetic field that pushes annular rows of magnets and the stator to which they are coupled. As with the previous embodiments, guide rails can be used to provide a backup air gap control system. An example of such an embodiment is described in more detail below.

In another alternative embodiment, the air gap control system 10 can include auxiliary windings on or near the outer surfaces of the stator 18. In such an embodiment, a system controller 87 can measure and compare the back-emf of the auxiliary windings to determine if the stator has moved off-center. The auxiliary windings can be, for example, on a different flux path than the primary windings of the stator 18. The system controller 87 can then send alternating current to the auxiliary winding (and not the primary winding of the stator 18) to generate an attractive force to be exerted on the stator 18. As with the previous embodiments, guide rails can optionally be used to provide a backup air gap control system. An example of such an embodiment is described in more detail below.

In another alternative embodiment, the air gap control system 10 can include wheels, rollers, or other mechanical force-applying members that are coupled to a portion of the stator support structure 52 in a relatively stiff manner. When an external force causes a deflection of a rotor portion of the rotor assembly 28, the rotor portion contacts one or more of the wheels or rollers and applies a force thereto that is transferred to the stator 18 via the stator support structure 52.

Figure 3:
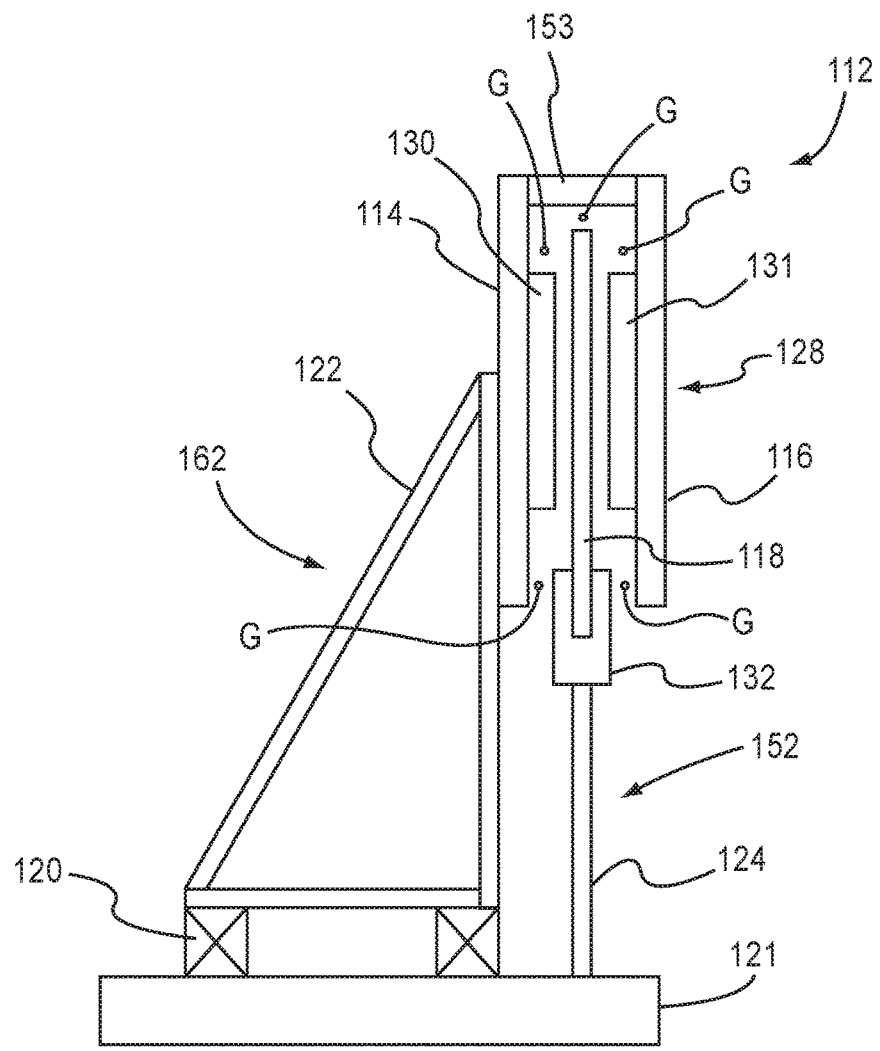
FIG. 3 is a schematic illustration of a portion of a rotor/stator assembly, according to an embodiment.

FIG. 3 is a schematic illustration of a portion of another embodiment of a rotor/stator assembly. The rotor/stator assembly 112 includes a rotor assembly 128, a stator 118, a rotor support structure 162 and a stator support structure 152. In this embodiment, the rotor assembly 128 is disposed for rotational movement relative to the stator 118. For example, the rotor assembly 128 can rotate about an axis A-A shown in FIG. 3. Thus, the rotor/stator assembly 112 is an example of an axial flux machine system.

The stator 118 can include the same features and perform the same functions as described above for stator 18. For example, the stator 118 can support a conductive winding (not shown in FIG. 3). The stator support structure 152 includes a stator support clamp 132, which is coupled to the stator 118 and a stator support member 124. The stator support member 124 couples the stator 118 to a stationary stator hub 121. The rotor/stator assembly 112 is an example of a system in which the stator 118 is supported on an inboard side of the system. In other words, the stator 118 is coupled to the stator support clamp 132 radially inboard of a portion of the rotor assembly 128.

The rotor assembly 128 includes a first rotor portion 114 and a second rotor portion 116, and an end support portion 153. The first rotor portion 114 supports a first magnet 130 and the second rotor portion 116 supports a second magnet 131. The magnets 130 and 131 can each be the same as or similar to and function the same as or similar to the magnets 30 and 31 described above. The stator 118 is disposed between the first rotor portion 114 and the second rotor portion 116. For example, the stator 118 can be centered or substantially centered between the first rotor portion 114 and the second rotor portion 116 as shown in FIG. 3. The rotor assembly 128 is coupled to rotor support structure 162 that includes rotor support members 122 and bearings 120. The bearings 120 provide for rotational movement of the rotor assembly 128 relative to the stator 118.

An air gap is defined at various locations between the first rotor portion 114 and the stator 118 and the second rotor portion 116 and the stator 118, and between the magnet 130 and the stator 118 and the magnet 131 and the stator 118. Thus, any of the embodiments of an air gap control system (not shown in FIG. 3) as described above with respect to FIGS. 1 and 2 and as described herein can be implemented at, for example, any of the air gap locations G indicated in FIG. 3, to maintain a desired air gap at that location.

As described above, the stator support clamp 132 and/or the stator support member 124 can be flexible or compliant such that when a force is exerted on the stator support clamp 132 and/or the stator support member 124 by the air gap control system, the stator 118 is moved to a position in which the stator 118 is centered or substantially centered between the first rotor portion 114 and the second rotor portion 116.

Figure 4:
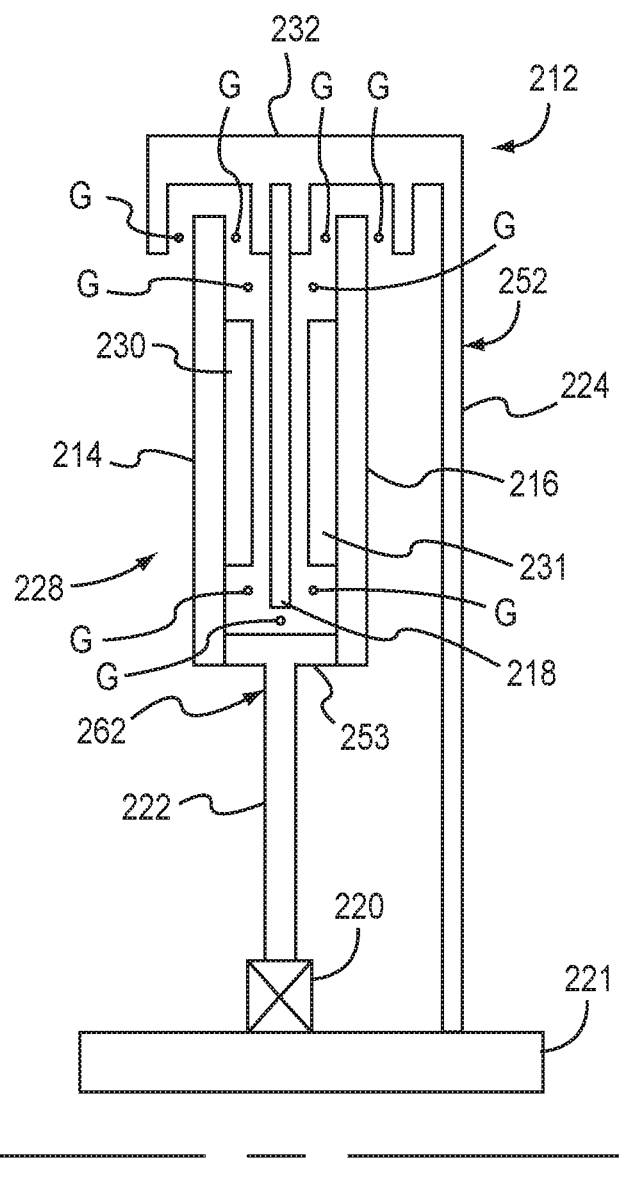
FIG. 4 is a schematic illustration of a portion of a rotor/stator assembly, according to an embodiment.

FIG. 4 is a schematic illustration of a portion of another embodiment of a rotor/stator assembly. The rotor/stator assembly 212 includes a rotor assembly 228, a stator 218, a rotor support structure 262 and a stator support structure 252. In this embodiment, the rotor assembly 228 is disposed for rotational movement relative to the stator 218. For example, the rotor assembly 228 can rotate about an axis A-A shown in FIG. 4. Thus, the rotor/stator assembly 212 is an example of an axial flux machine system.

The stator 218 can include the same features and perform the same functions as described above for stator 18. For example, the stator 218 can support a conductive winding (not shown in FIG. 4). The stator support structure 252 includes a stator support clamp 232, which is coupled to the stator 218 and a stator support member 224. The stator support member 224 couples the stator 218 to a stationary stator hub 221. The rotor/stator assembly 212 is an example of a system in which the stator 218 is supported on a radially outboard side of the system. In other words, the stator 218 is coupled to the stator support clamp 232 exterior or outboard of the rotor assembly 228.

The rotor assembly 228 includes a first rotor portion 214 and a second rotor portion 216, and an end support portion 253. The first rotor portion 214 supports a first magnet 230 and the second rotor portion 216 supports a second magnet 231. The magnets 230 and 231 can each be the same as or similar to and function the same as or similar to the magnets 30 and 31 described above. The stator 218 is disposed between the first rotor portion 214 and the second rotor portion 216. For example, the stator 218 can be centered or substantially centered between the first rotor portion 214 and the second rotor portion 216 as shown in FIG. 4. The rotor assembly 228 is coupled to rotor support structure 262 that includes a rotor support member 222 and a bearing 220. The bearing 220 provides for rotational movement of the rotor assembly 228 relative to the stator 218.

An air gap is defined at various locations between the first rotor portion 214 and the stator 218 and the second rotor portion 216 and the stator 218, and between the magnet 230 and the stator 218 and the magnet 231 and the stator 218. Thus, any of the embodiments of an air gap control system (not shown in FIG. 4) as described above with respect to FIGS. 1 and 2 and as described herein can be implemented at, for example, any of the air gap locations G indicated in FIG. 4, to maintain a desired air gap at that location.

As described above, the stator support clamp 232 and/or the stator support member 224 can be relatively flexible or compliant such that when a force is exerted on the stator support clamp 232 and/or the stator support member 224 by the air gap control system, the stator 218 is moved to a position in which the stator 218 is centered or substantially centered between the first rotor portion 214 and the second rotor portion 216.

As described above, the rotor/stator assembly 112 is an example of a system in which the stator 118 is supported on an inboard side of the system or inboard of a portion of the rotor assembly 128, and rotor/stator assembly 212 is an example of a system in which the stator is supported on an outboard side of the system or outboard of the rotor assembly 228. In alternative embodiments, a stator of a rotor/stator assembly can be supported both on an inboard side and an outboard side.

Figure 5:
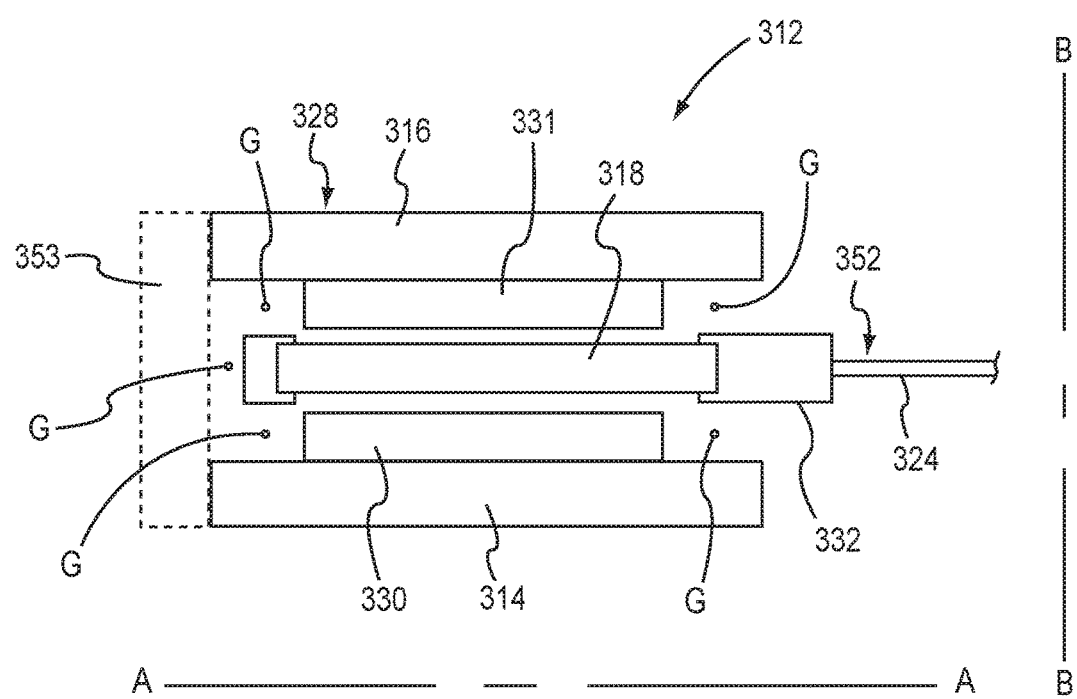
FIG. 5 is a schematic illustration of a portion of a rotor/stator assembly having a two-sided rotor, according to an embodiment.

FIG. 5 is a schematic illustration of a portion of another embodiment of a rotor/stator assembly. The rotor/stator assembly 312 includes a rotor assembly 328, a stator 318, a rotor support structure (not shown) and a stator support structure 352. In this embodiment, the rotor assembly 328 can be disposed for rotational movement relative to the stator 318 or for linear movement relative to the stator 318. For example, if the axis of rotation of rotor assembly 328 is axis B-B in FIG. 5, the rotor/stator assembly 312 is an axial flux machine system, similar to the embodiments shown in FIG. 3. If the axis of rotation of rotor assembly 328 is axis A-A in FIG. 5, the rotor/stator assembly 312 is a radial flux machine system. Alternatively, if the rotor assembly 328 moves linearly, rather than rotationally, with respect to stator 318, such as reciprocal movement into and out of the plane of FIG. 5, perpendicular to axes A-A and B-B, the rotor/stator assembly 312 has a linear machine architecture.

The stator 318 can include the same features and perform the same functions as described above for stator 18. For example, the stator 318 can support a conductive winding (not shown in FIG. 5). The stator support structure 352 includes a stator support clamp 332, which is coupled to the stator 318 and a stator support member 324. The stator support member 324 can couple the stator 318 to a stationary stator hub (not shown) as described above for previous embodiments. The rotor/stator assembly 312 is another example of an inboard mounted stator system (similar to embodiment of FIG. 3) in which the stator 318 is supported on an inboard side of the system.

The rotor assembly 328 includes a first rotor portion 314 and a second rotor portion 316, and an optional end support portion 353. The first rotor portion 314 supports a first magnet 330 and the second rotor portion 316 supports a second magnet 331. The magnets 330 and 331 can each be the same as or similar to and function the same as or similar to the magnets 30 and 31 described above. The stator 318 is disposed between the first rotor portion 314 and the second rotor portion 316. For example, the stator 318 can be centered or substantially centered between the first rotor portion 314 and the second rotor portion 316. The rotor assembly 328 can be coupled to a rotor support structure (not shown) that can include, for example, a rotor support member and a bearing that can provide for rotational movement of the rotor assembly 328 relative to the stator 318.

An air gap is defined at various locations between the first rotor portion 314 and the stator 318 and the second rotor portion 316 and the stator 318, and between the magnet 330 and the stator 318 and the magnet 331 and the stator 318. Thus, any of the embodiments of an air gap control system (not shown in FIG. 5) as described above with respect to FIGS. 1 and 2 and as described herein can be implemented at, for example, any of the air gap locations G indicated in FIG. 5, to maintain a desired air gap at that location.

As described above, the stator support clamp 332 and/or the stator support member 324 can be relatively flexible or compliant such that when a force is exerted on the stator support clamp 332 and/or the stator support member 324 by the air gap control system, the stator 318 is moved to a position in which the stator 318 is centered or substantially centered between the first rotor portion 314 and the second rotor portion 316.

Figure 6:
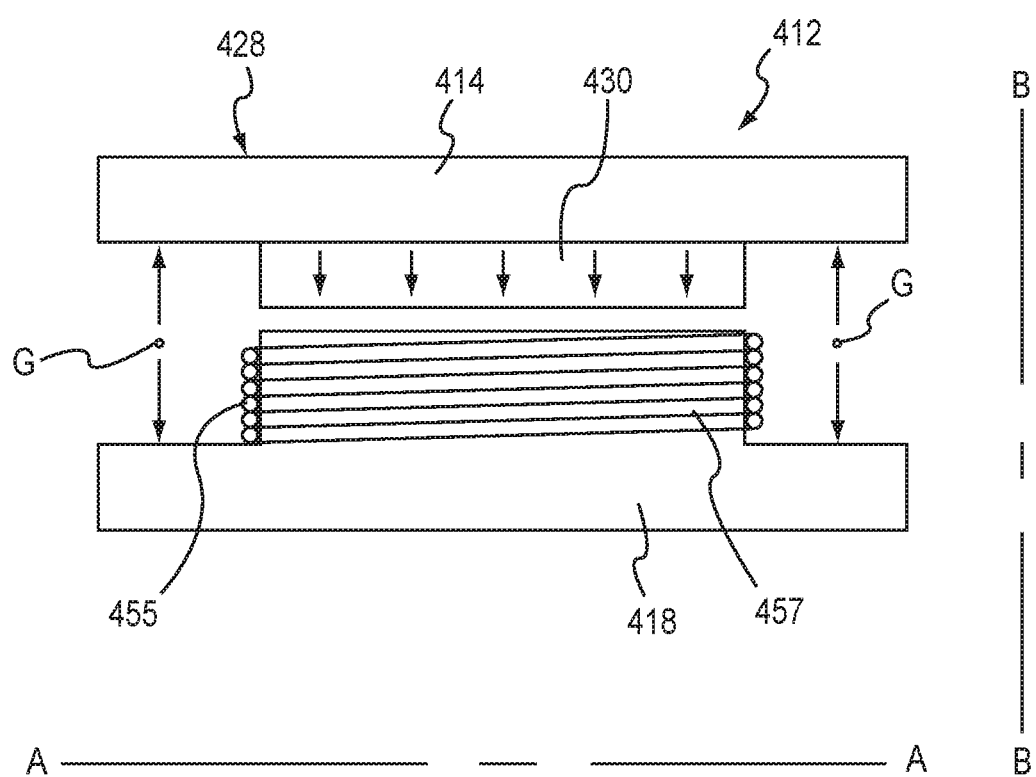
FIG. 6 is a schematic illustration of a portion of a rotor/stator assembly having a one-sided rotor, according to an embodiment.
Figure 7:
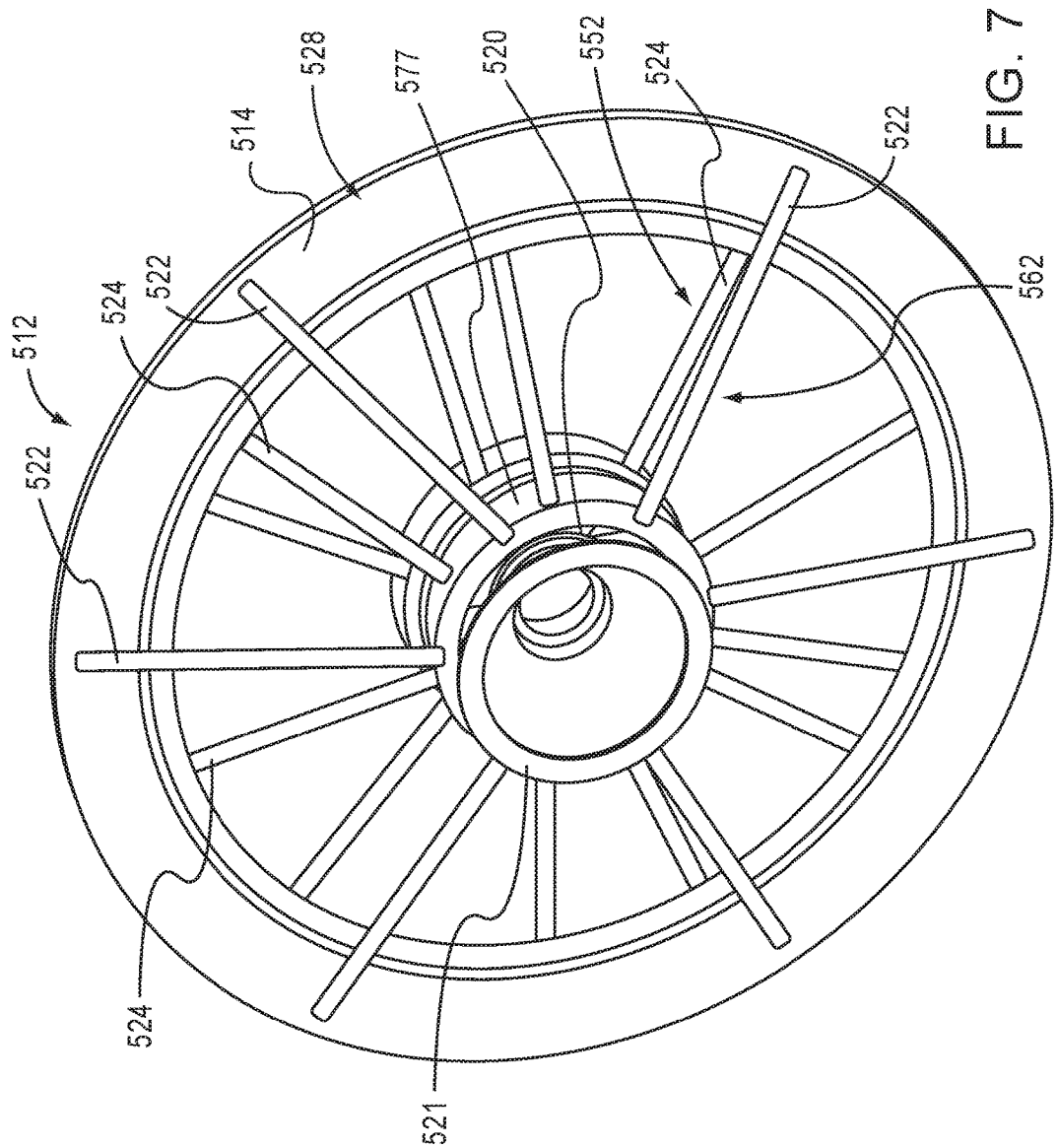
FIG. 7 is a perspective view of a rotor/stator assembly that can be used with an axial flux motor or generator, according to an embodiment.

FIG. 6 is a schematic illustration of a portion of another embodiment of a rotor/stator assembly. The rotor/stator assembly 412 includes a rotor assembly 428 and a stator 418. In this embodiment, the rotor assembly 428 includes a single rotor portion 414 that can support a magnet 430. The stator 418 includes conductive windings 455, which are wound around a core portion 457. In some embodiments, the core portion 457 can be, for example, ferromagnetic. The pole face of the magnet 430 is separated from windings 455 by an air gap such that the magnetic flux generally flows into, and changes direction in, the stator 418 and the rotor 428.

The stator 418 can be coupled to a stator support structure (not shown in FIG. 6) and can be coupled to a stationary hub (not shown in FIG. 6), as described above for previous embodiments. The rotor assembly 428 can be coupled to a rotor support structure (not shown in FIG. 6) that couples the rotor assembly 428 to a bearing (not shown in FIG. 6) that provides for movement of the rotor assembly 428 relative to the stator 418 and also bears the primary load of the rotor/stator assembly 412.

If the axis of rotation of rotor assembly 428 is axis B-B in FIG. 6, the rotor/stator assembly 412 is an axial flux machine system. If the axis of rotation of rotor assembly 428 is axis A-A in FIG. 6, the rotor/stator assembly 412 is a radial flux machine system. Alternatively, if the rotor assembly 428 moves linearly, rather than rotationally, with respect to stator 418, such as reciprocal movement into and out of the plane of FIG. 6, perpendicular to axes A-A and B-B, the rotor/stator assembly 412 has a linear machine architecture.

An air gap is defined at various locations between the rotor portion 414 and the stator 418 at which an embodiment of an air gap control system (not shown in FIG. 6) as described herein can be implemented. For example, an air gap control system can be used to control the air gap at locations G indicated in FIG. 6, to maintain a desired air gap between the rotor assembly 428 and the stator 418. In this embodiment, the air gap control system can, for example, maintain a minimum gap or distance or a nominal distance between the stator 418 and the rotor portion 414, rather than centering the stator 418 within the rotor assembly 428, for example, as described for rotor portion 328 and stator 318 shown in FIG. 5.

FIGS. 7-10 illustrate an embodiment of an axial rotor/stator assembly. The rotor/stator assembly 512 includes a rotor assembly 528, a stator assembly 518 (see, e.g., FIGS. 8 and 9), a rotor support structure 562 and a stator support structure 552. In this embodiment, the rotor assembly 528 is disposed for rotational movement relative to the stator assembly 518. The stator assembly 518 can include the same features and perform the same functions as described above for previous embodiments. For example, the stator assembly 518 can support a conductive winding 555 (see, e.g., the schematic illustration of FIG. 10). The stator support structure 552 includes multiple stator support members 524 and a stator support clamp 532 (see FIG. 10), which is coupled to the stator assembly 518. The stator support members 524 couple the stator assembly 518 to a stationary stator hub 521 (see FIG. 7). The rotor support structure 562 includes multiple rotor support members 522 coupled to a bearing 520. The bearing 520 is attached to a hub 577 extending through a central opening of the stator hub 521 and can function similar to an axle to provide for rotational movement of the rotor assembly 528 relative to the stator assembly 518.

Figure 9:
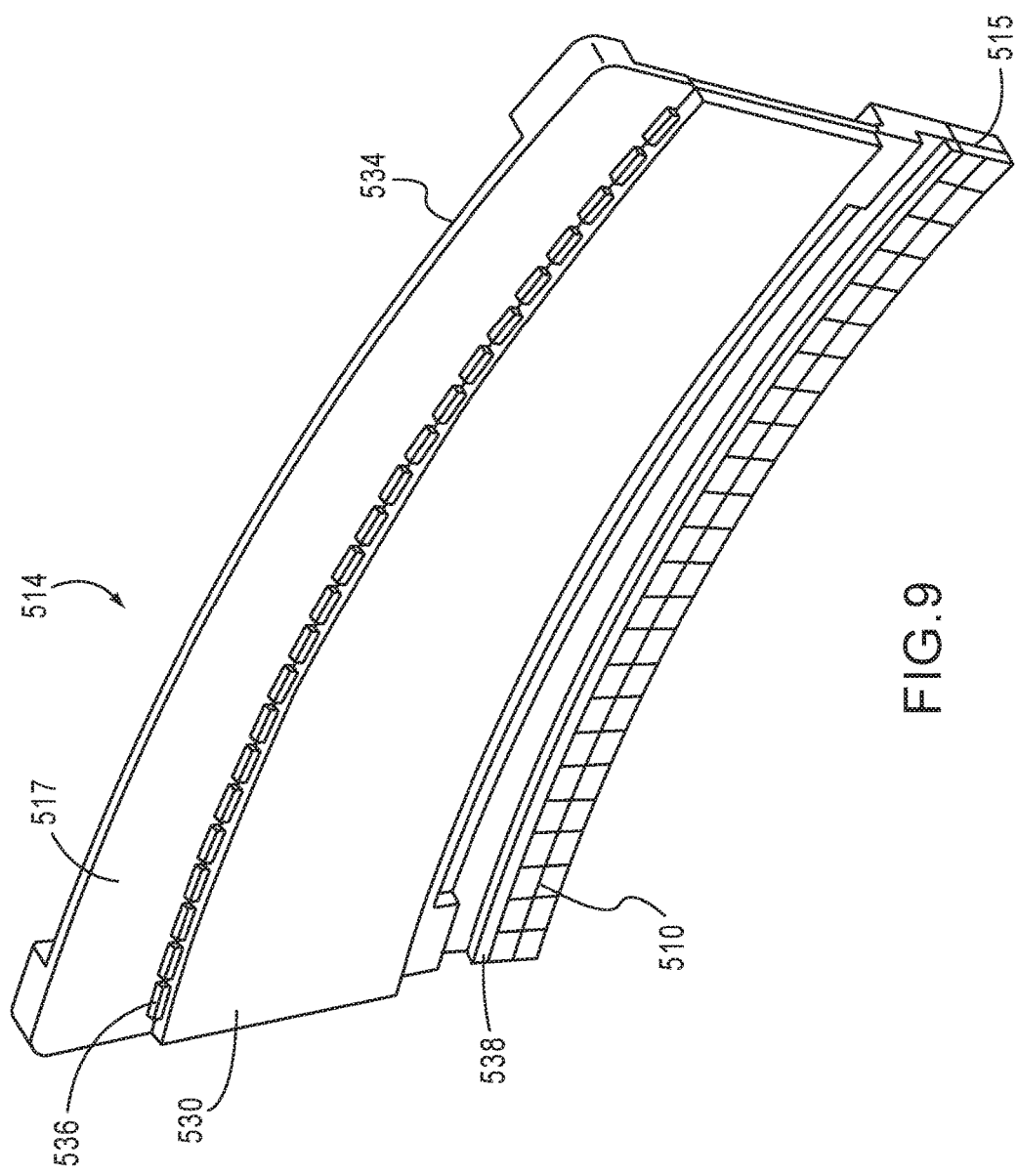
FIG. 9 is an enlarged view of a portion of the rotor/stator assembly shown in FIG. 7 showing a portion of an air gap control system mounted thereto.
Figure 10:
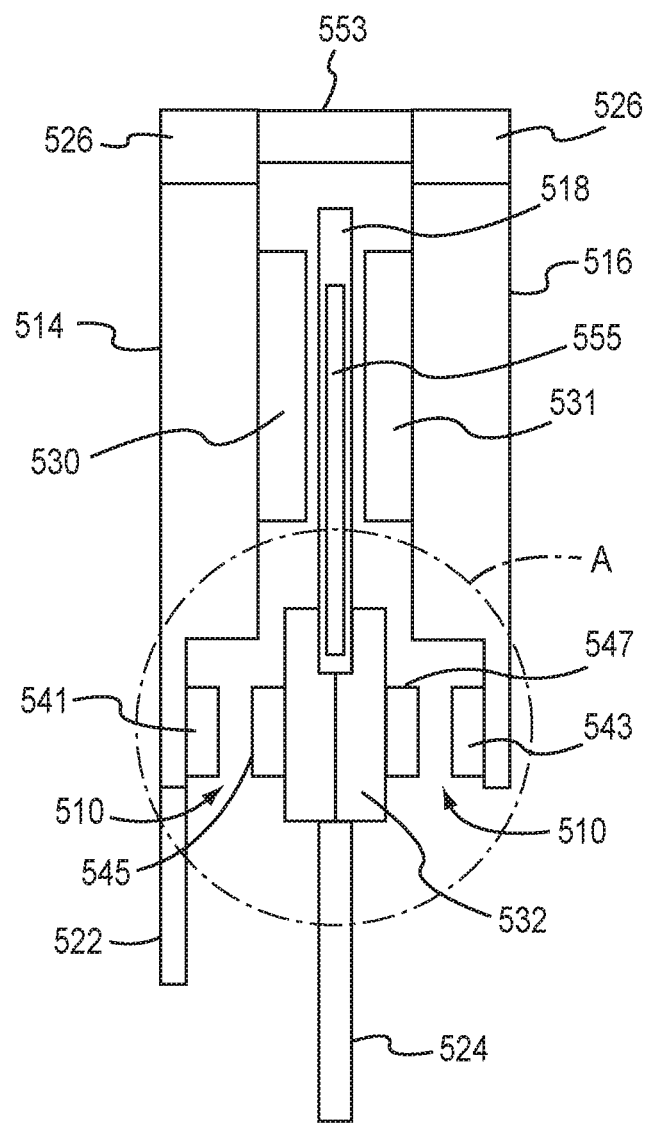
FIG. 10 is a schematic illustration of a section of a portion of the rotor/stator assembly of FIG. 7 with a portion of an air gap control system mounted thereto.
Figure 11:
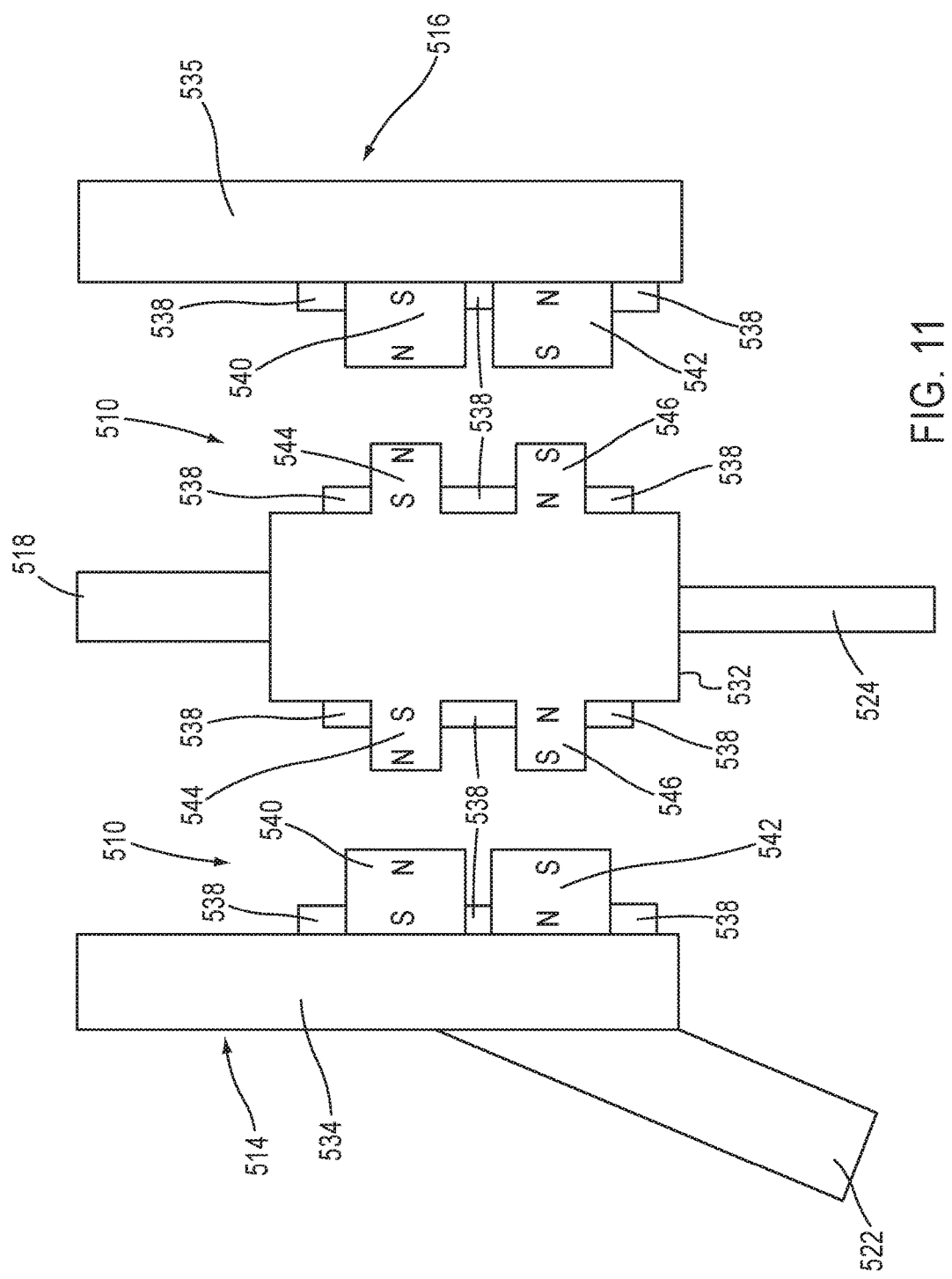
FIG. 11 is a schematic illustration of a portion of the rotor/stator assembly and a portion of an air gap control system shown in FIG. 10 taken at "A" in FIG. 10.

The rotor assembly 528 includes a first rotor portion 514, a second rotor portion 516, and an end support portion 553 (see FIG. 10). The first rotor portion 514 supports a first magnet 530 and the second rotor portion 516 supports a second magnet 531. The magnets 530 and 531 can each be the same as or similar to and function the same as or similar to the magnets 30 and 31 described above with respect to FIG. 1. The magnets 530 and 531 can be, for example, magnet pole assemblies or an array of magnets, which direct flux in an axial direction from the magnet poles on one rotor portion (e.g., rotor portion 514) to the magnet poles of opposite polarity on the other rotor portion (e.g., rotor portion 516). As shown, for example, in FIG. 9, magnet 530 is mounted or supported on a rotor back iron 534 of rotor portion 514 with a pole magnet retainer 536. Magnet 531 can be mounted on second rotor portion 516 in a similar manner. The first rotor portion 514 is coupled to the multiple rotor support members 522, which is coupled to the bearing 520. The second rotor portion 516 can be coupled to the first rotor portion 514 with spacer blocks 526 at an outer diameter portion of rotor/stator assembly 512, such that the first and second rotor portions 514 and 516 can rotate together, and deflect primarily in an axial direction as a single, structurally rigid subassembly. For example, in some embodiments, the spacer blocks 526 can be coupled to mounting pads 525 with a bolt, screw or other coupling mechanism. In some embodiments, the end support portion 553 can be integrally or monolithically formed with the spacer blocks 526 (in other words, spacer blocks 526 and end support portion 553 are a single component).

The stator assembly 518 is disposed between the first segmented rotor portion 514 and the second segmented rotor portion 516. For example, the stator assembly 518 can be centered or substantially centered between the first segmented rotor portion 514 and the second segmented rotor portion 516. As shown in FIG. 9, stator assembly 518 can include an annular array of stator segments 559. Each segment 559 can include a printed circuit board sub-assembly as described above for stator 18.

As described above, the stator assembly 518 is coupled to the stator support clamp 532, which is coupled to a rim of stationary stator hub 521 via the structural support members 524. Stator hub 521 can be coupled to a support structure and/or housing arrangement (not shown), which can further maintain the stator assembly 518 in a fixed or stationary position. As described above, the stator support clamp 532 and/or the stator support member 524 can be relatively flexible or compliant such that when a force is exerted on the stator support clamp 532 and/or the stator support member 524 by the air gap control system 510 (described below), the stator assembly 518 can be moved.

Figure 8:
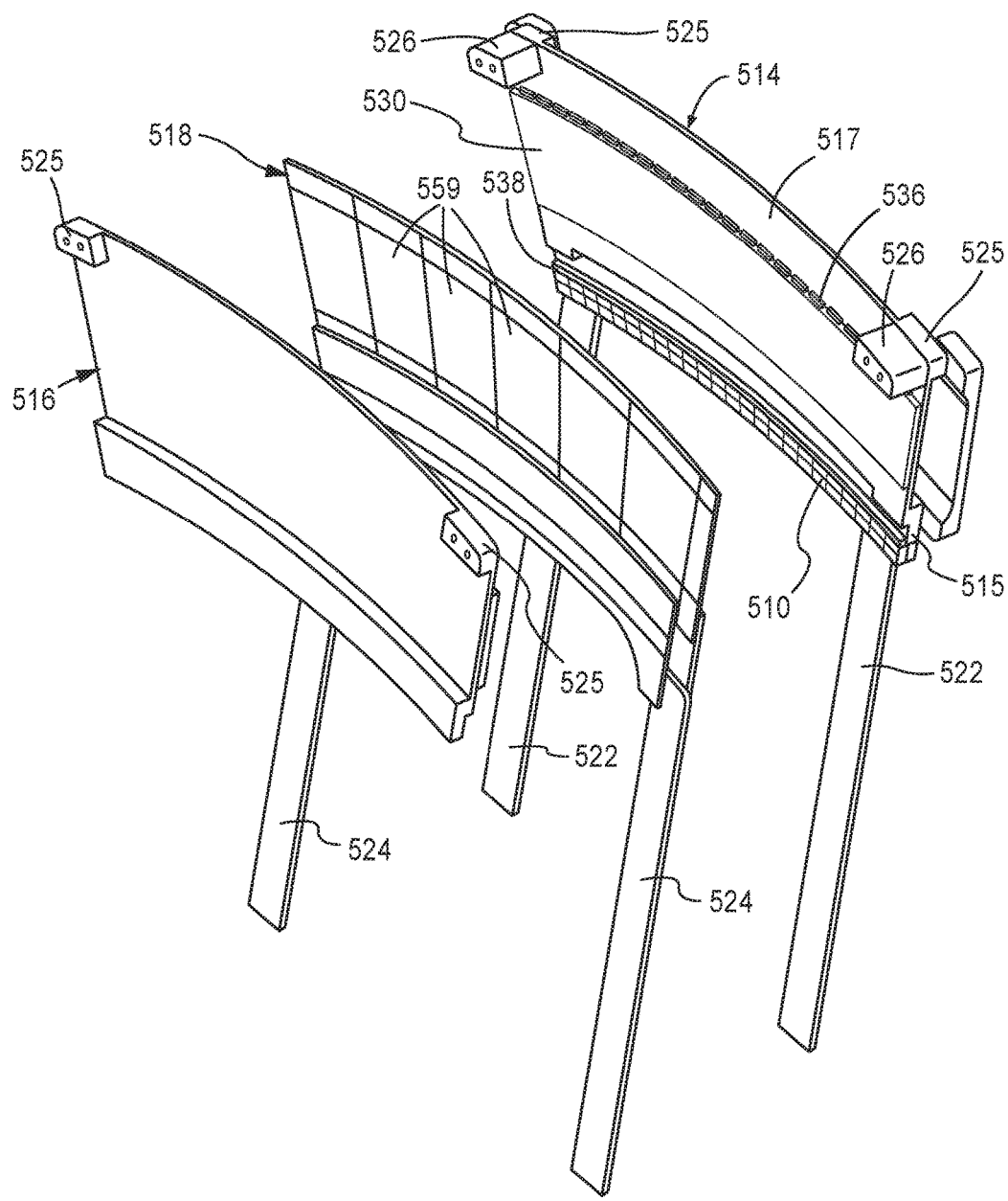
FIG. 8 is an exploded detail view of a portion of the rotor/stator assembly of FIG. 7, showing one of the rotors with a portion of an air gap control system mounted thereto.

Referring now to the schematic illustration of FIG. 10, an air gap can be defined at various locations between the first rotor portion 514 and the stator assembly 518 and between the second rotor portion 516 and the stator assembly 518. As described above, during operation of the rotor/stator assembly 512, it is desirable to maintain the air gap or distance between the first and second rotor portions 514 and 516 and the stator assembly 518. An air gap control system 510 can be coupled to the rotor assembly 528 and/or the stator assembly 518 and used to control or maintain a desired gap distance between the rotor portions 514 and 516 and the stator assembly 518. FIGS. 8 and 9 illustrate a portion of the air gap control system 510 coupled to an inner circumference portion 515 of the rotor portion 514, which is not to preclude having the air gap control system 510 coupled to an outer circumference feature 517 instead of, or in addition to the inner circumference. For example, in alternative embodiments, a second air gap control system (not shown) can optionally be disposed at a radially outer portion 517 of the rotor portion 514. In another alternative embodiment, an air gap control system 510 can be disposed only at the radially outer portion 517 of rotor portion 514 rather than at the radially inner portion 515 of the rotor portion 514.

As shown in FIG. 9, the air gap control system 510 can be mounted to the first rotor back iron of the first rotor portion 514 with one or more air gap control magnet retainers 538. The air gap control assembly 510 can be coupled to the second rotor portion 516 in a similar manner. In this embodiment, the air gap control system 510 is also coupled to the stator assembly 518 as shown for example, in the schematic illustration of FIG. 10.

During operation of the rotor/stator assembly 512, if there is relative movement or deflection of the stator assembly 518 with respect to either of the first and second rotor portions 514 or 516, the air gap control system 510 can induce a centering force that acts to move the stator assembly 518 to a centered or substantially centered location between the first rotor portion 514 and the second rotor portion 516. For example, if first rotor portion 514 or second rotor portion 516 are moved or deflected by an external loading or inertial acceleration, air gap control assembly 510 can exert a force on stator assembly 518, causing stator assembly 518 to maintain a nominal location, for example, centered between first rotor portion 514 and second rotor portion 516.

More specifically, when stator assembly 518 undergoes an axial translation relative to first rotor portion 514 and second rotor portion 516 because of an external force (whether temporary or constant) applied to rotor portions 514 and 516 and that moves or deflects rotor portions 514 and 516 in an axial direction, the gap distance on one side of stator assembly 518 increases and the gap distance on the other side of stator assembly 518 decreases. In response, air gap control system 510 exerts a force on annular stator assembly 518 to re-center annular stator assembly 518 between annular rotor portions 514 and 516. Similarly, if stator assembly 518 undergoes an angular deflection relative to rotor portions 514 and 516 (such that in any given section of stator assembly 518, a gap distance at an inner diameter of stator assembly 518 is different than a gap distance at an outer diameter of stator assembly 518) then air gap control system 510 will exert a moment on stator assembly 518 that restores a uniform gap distance between stator assembly 518 and each of first and second rotor portions 514 and 516.

As shown in FIG. 10, in this embodiment, the air gap control system 510 includes a first magnet assembly 541 coupled to the first rotor portion 514, a second magnet assembly 543 coupled to the second rotor portion 516, a third magnet assembly 545 coupled to the stator assembly 518 and a fourth magnet assembly 547 coupled to the stator assembly 518. More specifically, as shown in the schematic illustrations of FIGS. 11-16, the first magnet assembly 541 can include a magnet 540 mounted with its south facing magnet pole against rotor back iron 534 of rotor portion 514 and a magnet 542 mounted with its north facing magnet pole against the rotor back iron 534. The magnet assembly 543 can include a magnet 544 mounted with its south facing magnet pole against the stator support clamp 532 (also referred to as a "stator back iron"), and a magnet 546 mounted with its north facing magnet pole against stator back iron 532. Similarly, the third magnet assembly 545 can include a magnet 540 mounted with its south facing magnet pole against a rotor back iron 535 of rotor portion 516 and a magnet 542 mounted with its north facing magnet pole against the rotor back iron 535. The magnet assembly 547 can include a magnet 544 mounted with its south facing magnet pole against the stator back iron 532 and a magnet 546 mounted with its north facing magnet pole against stator back iron 532. Magnets 540, 542, 544 and 546 can each be held in place with magnet retainers 538. The magnet assemblies 541, 543, 545, and 547 are mounted in a circumferential pattern around the entire inner diameter of the inner face of first and second rotor portions 514 and 516 and circumferentially around the entire inner diameter of both faces of stator assembly 518.

Figure 12:
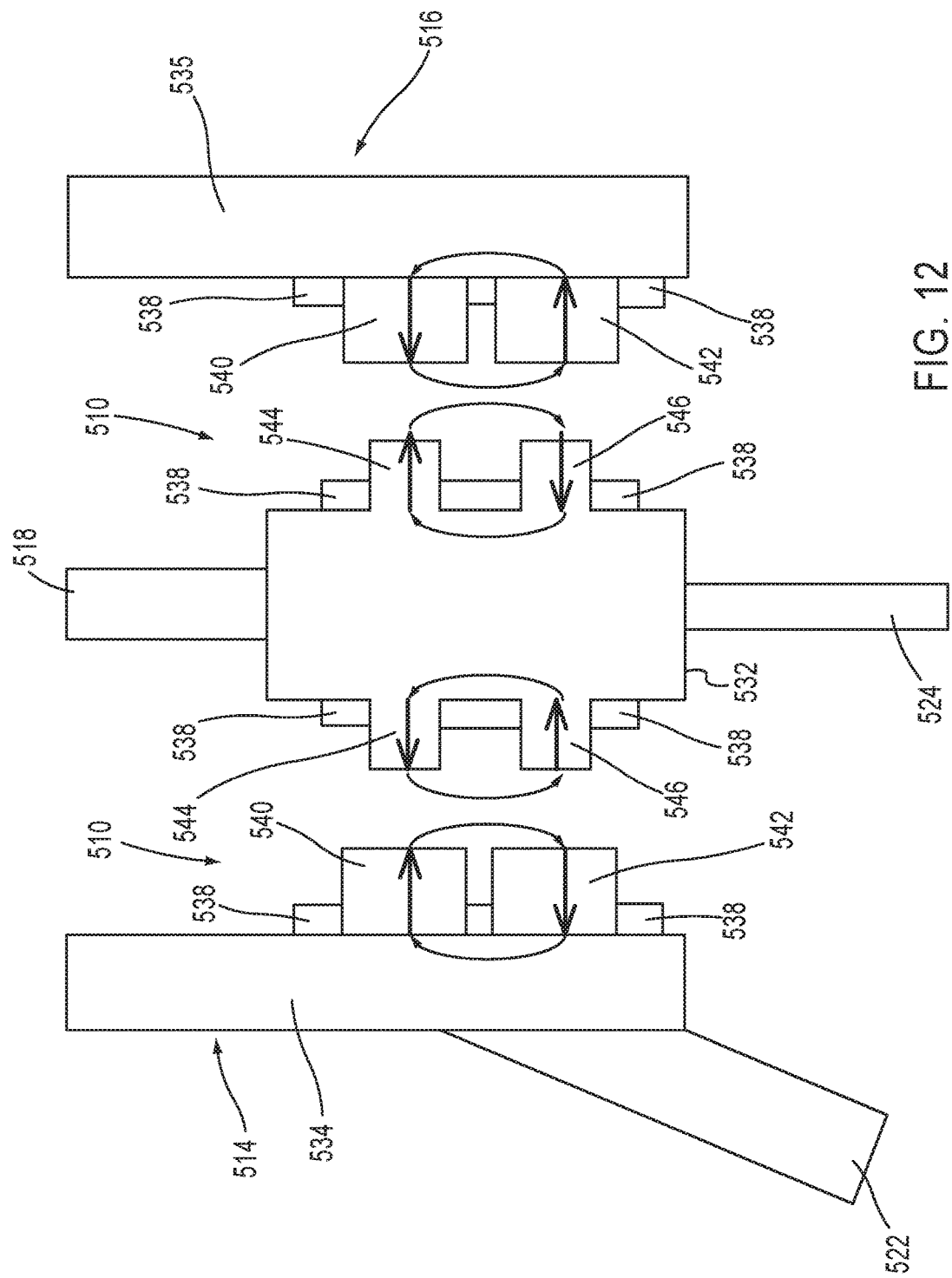
FIGS. 12-16 are schematic illustrations of the portion of the rotor/stator assembly and air gap control system shown in FIG. 11.

The rotor back irons 534 and 535 can be formed, for example, with a magnetically permeable material, such as iron or steel, and can provide both a return path for flux to pass from one row of magnets 542 to an adjacent row of magnets 540 as well as providing structural rigidity to react the attractive force between rotor portions 514 and 516 as shown by the flux arrows in FIG. 12, which illustrate the predominant direction of flux. For example, the polarity of one row of magnets (e.g., 542) opposes the polarity of the row of magnets (e.g., 546) it faces across the air gap. Stator clamp ring 532 can also be made from a magnetically permeable material, which in the vicinity of magnets 544 and 546 provides a return path for flux to travel from one row of magnets 546 to the adjacent row of magnets 544 as illustrated in FIG. 12. In alternative embodiments, a flux return path can be created, for example, with a Halbach array or a horseshoe magnet. In addition, although this embodiment shows north facing magnets disposed above south facing magnets, in alternative embodiments, the south facing magnets can be disposed above the north facing magnets.

The magnets 540, 542, 544 and 546 can be, for example, neodymium-iron-boron (NdFeB) permanent magnets. It should be understood, however, that this is just an example of the type of magnet that can be used. With the magnet arrangement shown in FIG. 12, the air gap control system 510 can function similar to a two-sided, passive permanent magnet bearing. Because the opposing magnets are placed in a nearly continuous ring around both the rotor portions 514, 516 and the stator assembly 518, the effect of eddy current drag, which would be induced by an alternating magnetic field at a given location due to the relative motion, can be thereby minimized. Although a continuous ring of arc-shaped magnets would further reduce this effect, the spacing implemented in this embodiment is such that the discontinuities present can be smoothed out across the air gap control system's rotor-to-stator spacing. Thus, rectangular shaped magnets can be used. In applications where this axial magnet-to-magnet dimension is significantly smaller, arc segments or a continuous ring of magnets may be desirable to further reduce drag.

Magnets 540 and 544 are oriented in such a manner that the polarity of axially opposing magnets is in opposite directions. Magnets 542 and 546 are also oriented in such a manner that the polarity of axially opposing magnets is in opposite directions. As a result, north pole faces of magnet pairs 540 and 544 face each other and south pole faces of magnet pairs 542 and 546 face each other. Through this arrangement, there is a repulsive force between magnet pairs 540 and 544 as well as 542 and 546 (on both sides of stator assembly 518), and this force can increase as magnet pairs are brought closer together by reducing the physical gap between them. In a nominal, equilibrium position shown in FIG. 12 (i.e. with stator assembly 518 substantially centered between rotor portion 514 and rotor portion 516), the repulsive forces on either side of the stator assembly 518 are equal and opposite, resulting in no net force on stator assembly 518.

Figure 13:
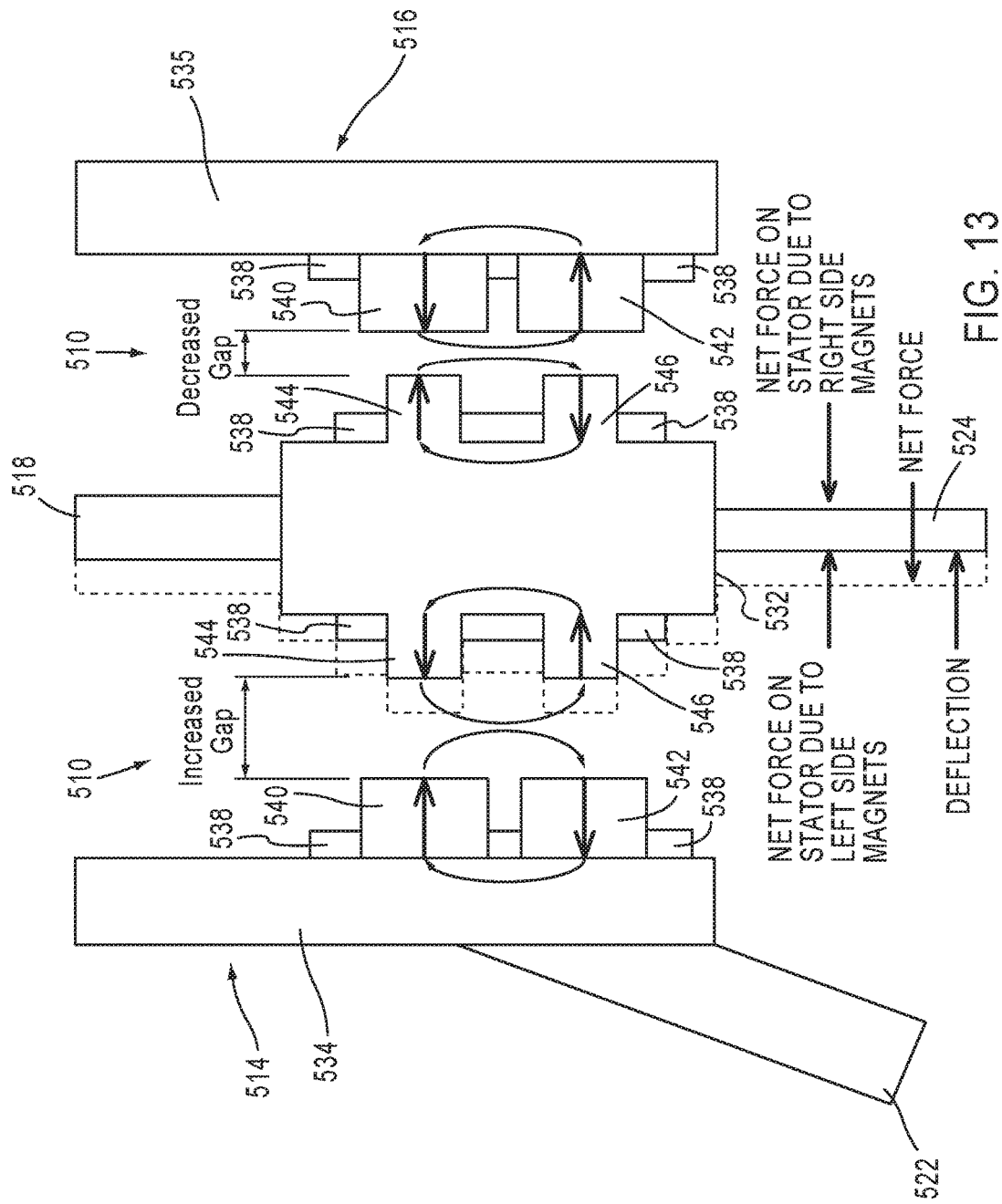
Figure 14:
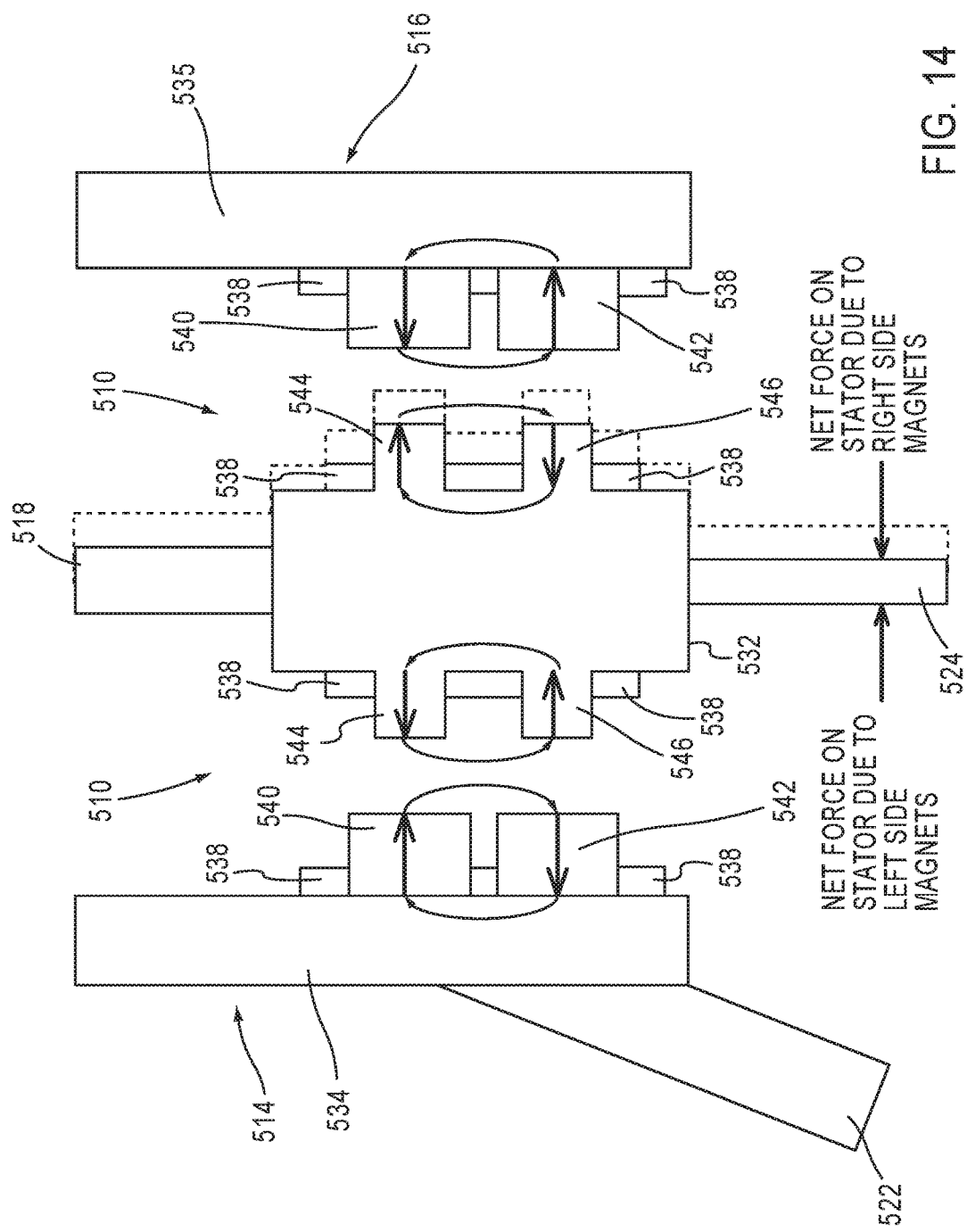

FIG. 13 shows the rotor/stator assembly 512 after there has been a deflection or movement of either the rotor portion 514 or the rotor portion 516 caused by, for example, fluctuations in torque, speed, or as a result of other inertial dynamics, inherent to or externally applied to the rotor/stator assembly 512. As shown in FIG. 13, the physical gap or distance between magnets 540 and 542 of rotor portion 516 and magnets 544 and 546 on the right side of stator assembly 518 is reduced, resulting in an increase in repulsive force between those magnets. The physical gap or distance between magnets 540 and 542 of rotor portion 514 and magnets 544 and 546 on the left side of stator assembly 518 is increased, resulting in a reduction in repulsive force between those magnets. The net result of force exerted on the stator assembly 518 is a net force to the left, acting to move or center stator assembly 518 between rotor portion 514 and rotor portion 516. This re-centering and balance of forces on the left and right sides of stator assembly 518 is shown in FIG. 14. FIG. 14 illustrates the stator assembly 518 after the stator assembly 518 has returned to an equilibrium position due to removal of the external force causing the initial displacement. It should be noted that this "at rest" equilibrium position can be biased one way or the other. In other words, it does not have to be equal. For example, in the case of an installation with a vertical axis where there is a constant force of gravity, the "at rest" position may be displaced one way or the other, or conversely, the force generating features can be sized differently on each side of the rotor assembly 514 to achieve a desired "at rest" position.

Figure 15:
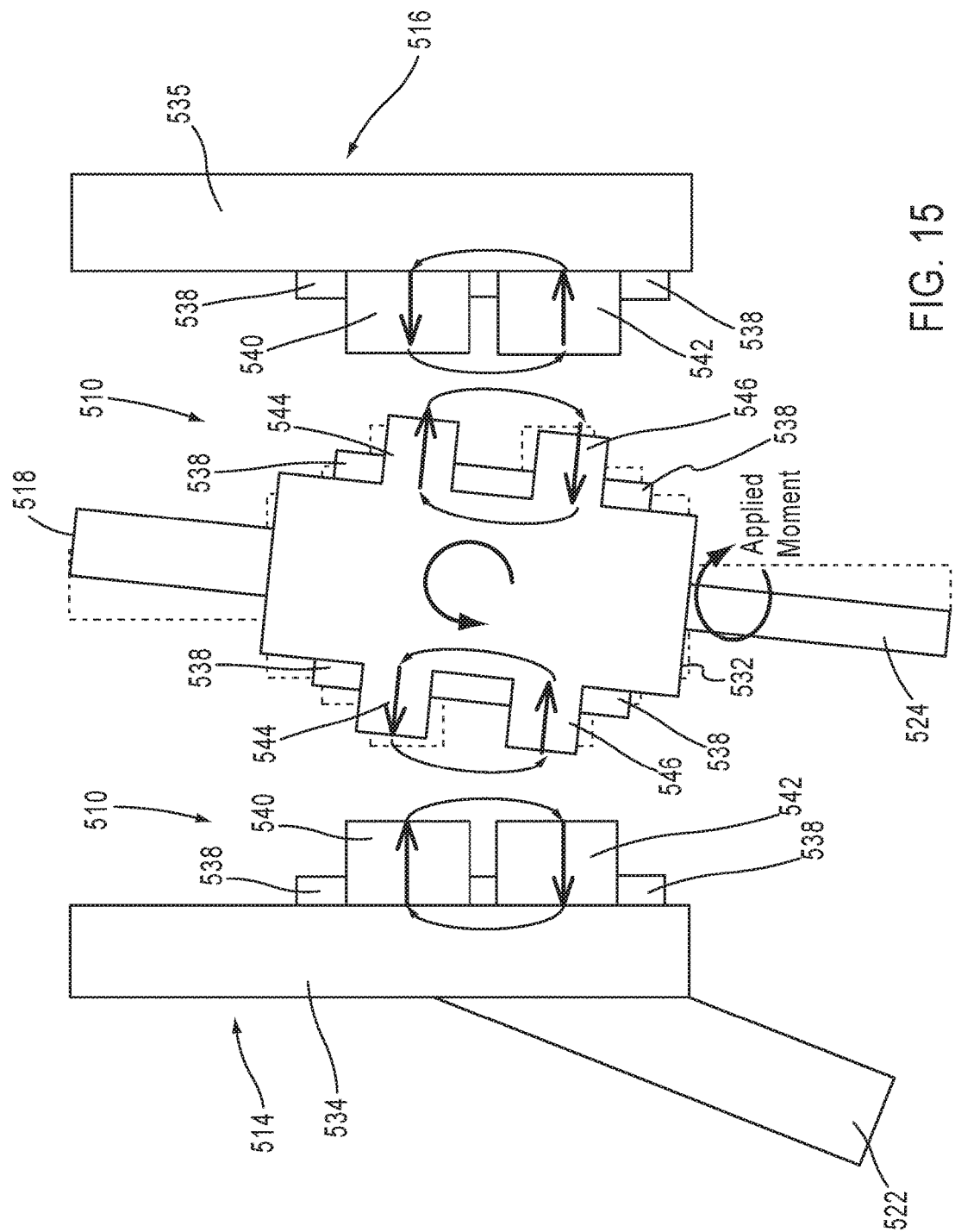
Figure 16:
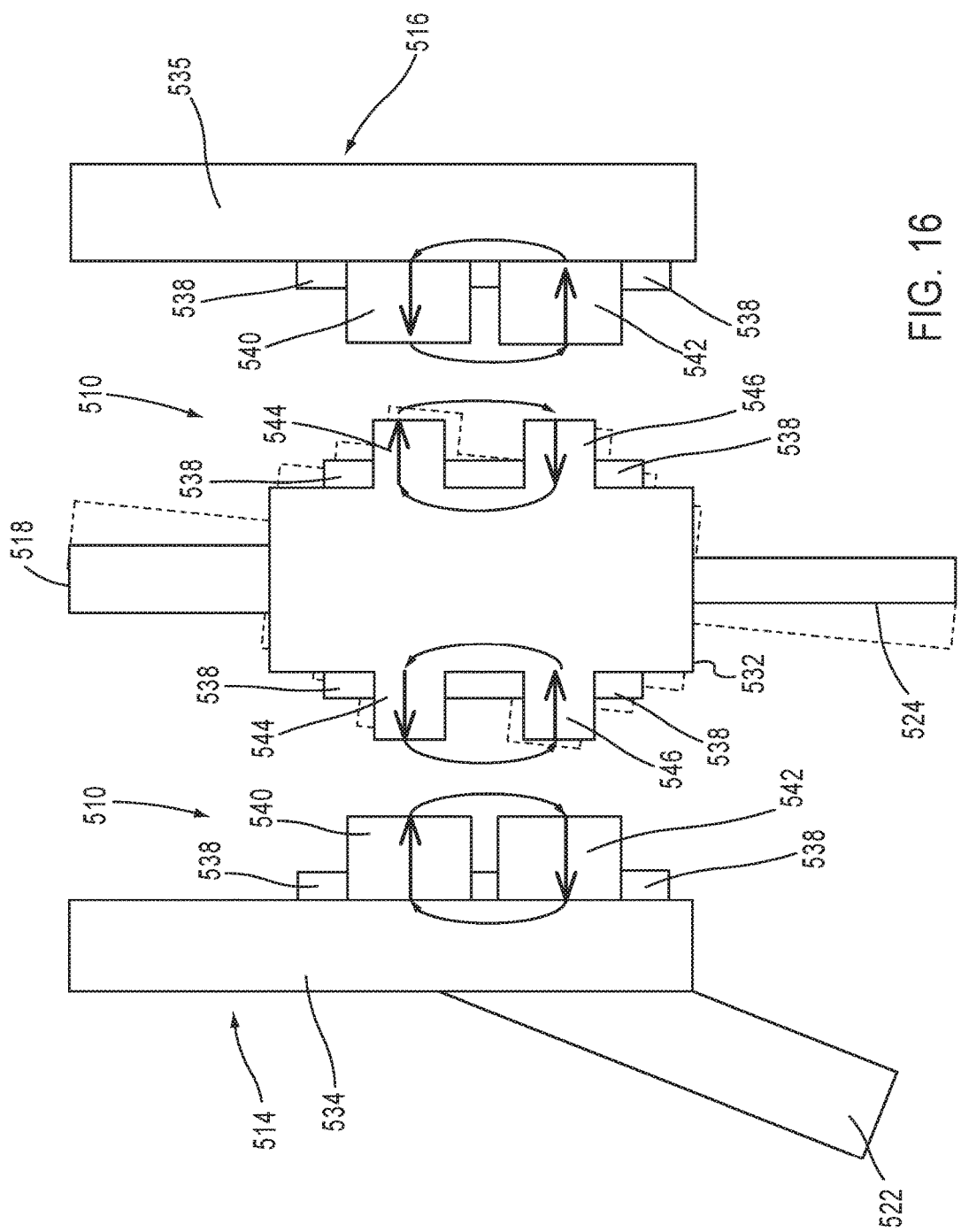

Additionally, the repulsive forces between axial pairs of magnets 540 and 544 and of magnets 542 and 546 counteract angular deflection of stator assembly 518 relative to rotor portions 514 and 516 by reacting against bending moments as shown in FIG. 15. These bending moments can be, for example, a result of deflection in stator support members 524 or of inertial loading of the rotor/stator assembly 512. The reactive moment applied to stator assembly 518 by air gap control system 510 can restore a uniform gap distance between stator assembly 518 and each of the rotor portions 514 and 516, as shown in FIG. 16. FIG. 16 illustrates the stator assembly 518 when the stator assembly 518 has returned to an equilibrium position due to removal of the applied moment causing the initial displacement.

The angular stiffness of an air gap control system 510, i.e. its resistance to angular deflection of stator assembly 518, can vary with the strength of its magnets, the distance between the magnets in the direction of the air gap, the radial distance of the magnets from the radially inner end of the stator assembly 518, and the radial separation of the individual magnets of magnet assemblies 541, 543, 545 and 547 established by retainers 538. Thus the air gap control system 510 can be designed with a desired "track width" or radial location along the rotor portions 514 and 516 and/or stator assembly 518 to achieve the desired angular stiffness relative to its axial stiffness (which does not necessarily depend on radial location).

As described previously, the air gap control system 510 can maintain the desired gap or distance between two members (e.g., the rotor and the stator) by transmitting a force from the stiffer first member to the compliant second member, where the second member is relatively compliant in the direction of the gap. Thus, in the axial rotor/stator assembly 512 described above, which has an axial gap, the second member (i.e. stator assembly 518) is relatively compliant in the axial direction, while in a machine having a radial gap, the second member would be relatively compliant in the radial direction.

Figure 17:
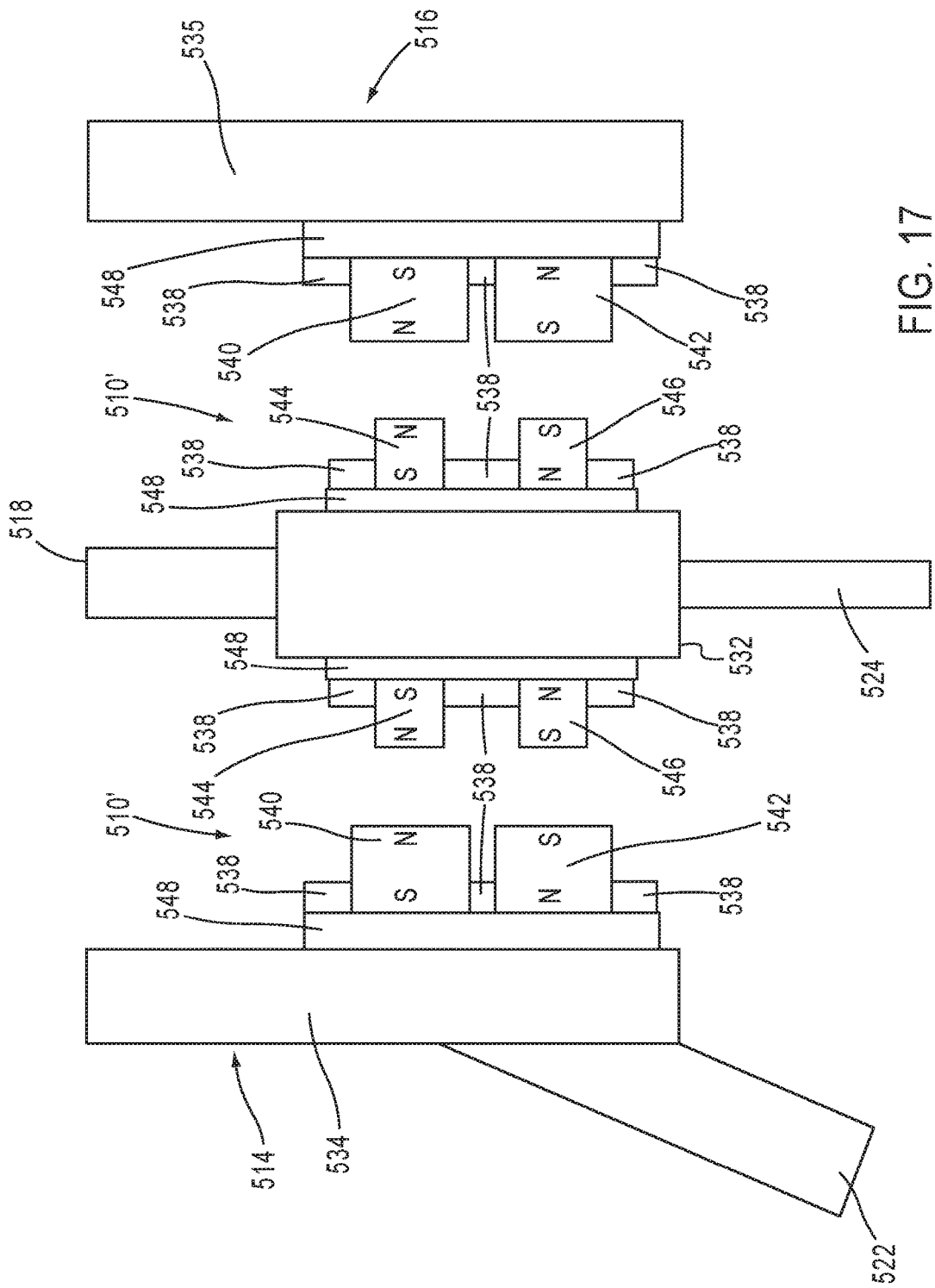
FIG. 17 is a schematic illustration of a portion of the rotor/stator assembly of FIG. 7 taken at "A" and a portion of an air gap control system, according to an alternative embodiment, coupled thereto.

An alternative air gap control system is shown in FIG. 17. In this embodiment, an air gap control system 510' is coupled to the rotor/stator assembly 512 described above. The air gap control system 510' can be configured the same as the air gap control system 510 except in this embodiment, the flux return function for magnets 544 and 546 and the flux return function for magnets 542 and 540 can be enabled by inserting a small magnetically permeable material segment 548 directly behind magnets 544 and 546 and retainers 538, and behind magnets 542 and 540 and retainers 538 to provide an independent flux return path. Segments 548 may be separately installed in a stator clamp ring 532 and rotor back irons 534 and 535, which in the vicinity of the air gap control magnets (540, 542, 544, 546), may be composed of a relatively impermeable material, such as, for example, aluminum, austenitic stainless steel, or plastic.

Figure 18:
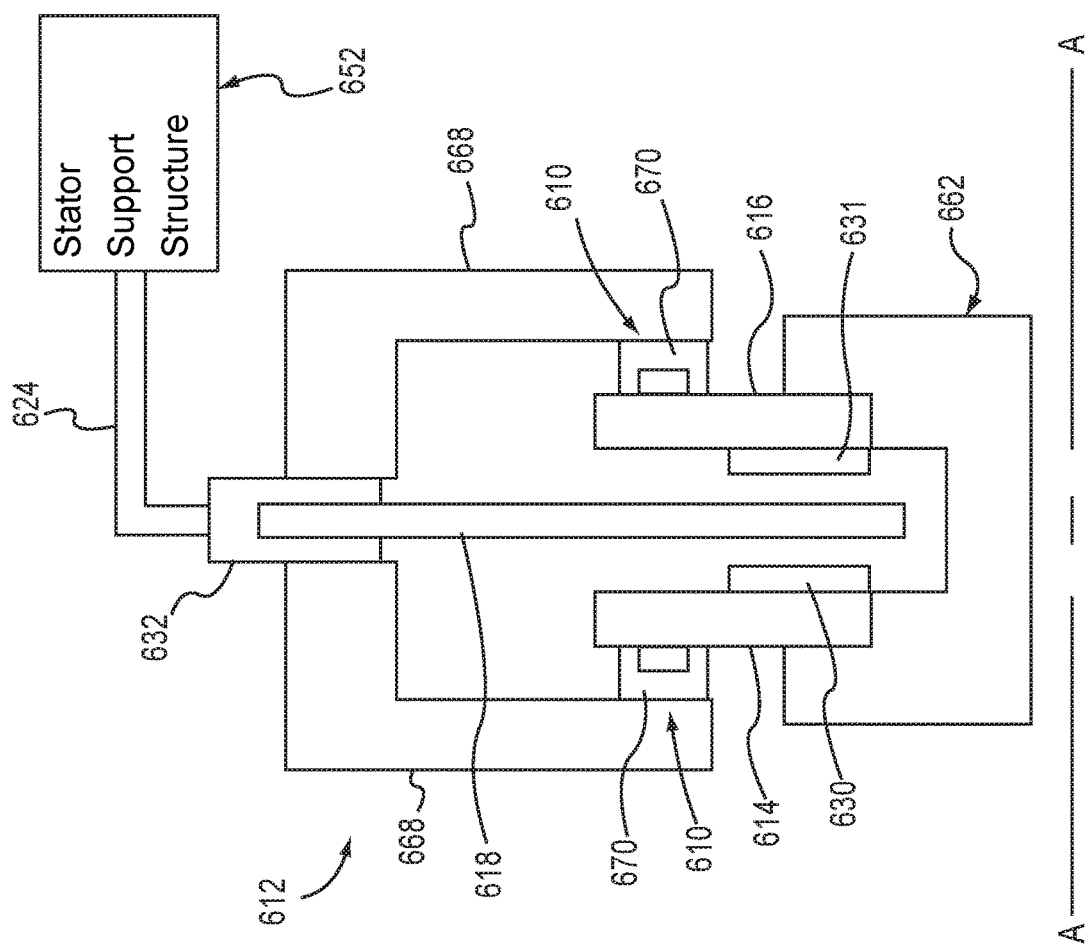
FIG. 18 is a schematic illustration of an axial rotor/stator assembly and a portion of an air gap control system, according to an embodiment.

FIG. 18 is a schematic illustration of an axial rotor/stator assembly 612 according to another embodiment. The rotor/stator assembly 612 includes a stator support structure 652 that can support one or more stator support members 624 to which a stator clamp ring 632 is coupled. Stator clamp ring 632 can support an outer circumference of a segmented annular stator 618 along its own inner circumference. The segmented stator 618 can be configured the same as described for previous embodiments and can support a conductive winding (not shown). Rotor/stator assembly 612 also includes a rotor support structure 662, which supports an inner circumference of a first segmented annular rotor portion 614 and an opposing second segmented annular rotor portion 616. Annular rotor portions 614 and 616 are positioned on opposite sides of the segmented annular stator 618 and can rotate about an axis A-A relative to the annular stator 618. The first rotor portion 614 supports a first magnet 630 and the second rotor portion supports a second magnet 631. The magnets 630 and 631 can be configured the same as described for previous embodiments. The axial rotor/stator assembly 612 further includes one or more stationary outriggers 668 coupled to both sides of the stator clamp ring 632 at spaced locations.

As described above for previous embodiments, stator support members 624 can be relatively compliant in an axial direction compared to rotor support structure 662, which is axially rigid or stiff. The stiffness of stator support members 624 and rotor support structure 662 in non-axial directions can be relatively or substantially equal, or at least sufficient to satisfy any structural requirements of the particular application in which axial rotor/stator assembly 612 is used.

In this embodiment, an air gap control system 610 includes guide rails 670 coupled to the stationary outrigger 668 and disposed between the stationary outrigger 668 and the first rotor portion 614, and between the stationary outrigger 668 and the second rotor portion 616. The guide rails 670 can be formed with, for example, a material with a low coefficient of friction and robust wear properties. In operation, when an external force causes movement (e.g., an axial deflection) of either annular rotor portion 614 or annular rotor portion 616, that rotor portion contacts one of the guide rails 670 and thus applies a force to that guide rail 670. The force is transmitted from guide rail 670, through stationary outrigger 668, stator clamp ring 632, and to stator support members 624 where it causes stator support members 624 to deflect in the axial direction. The stator support members 624 can then prevent or limit further movement of, or contact between, the annular rotor portions 614 or 616 and the annular stator 618 and can act to re-center annular stator 618 between first annular rotor portion 614 and second annular rotor portion 616, thereby maintaining a desired air gap clearance or distance between the stator 618 and the rotor portions 614 and 616.

FIG. 19 illustrates embodiment of an alternative air gap control system coupled to the rotor/stator assembly 612. In this embodiment an air gap control system 710 is an active system that includes a controllable force generating device (in this embodiment, an air bearing) and a controller that varies the applied force to the stator 618 based on input from proximity sensors or mechanical levers that are actuated by contact with the guide rail to position the air bearing air supply throttle valve. In this embodiment, an air gap control system 710 includes a compressed air supply source 754 coupled to the rotor/stator assembly 612 that provides compressed air to an air supply manifold 772, which feeds the compressed air into channels 774 defined within stationary outrigger 668. The compressed air is then released through an orifice 776 integrated into guide rail 770, thus forming an air bearing. The air supply manifold 772 can include one or more orifices (not shown), and can also include a pressure regulating system (not shown). A system controller 787 is coupled to and/or in communication with the air supply manifold 772 and can control the volume of air released into the channels 774 based on input from a proximity sensor (not shown) or mechanical lever (not shown) that can be used to position the air supply throttle valve (not shown), or respond to pressure changes as the air bearing changes its clearance from 614 or 616 as described below, and increase or decrease flow as needed to position the rotor portion 614 or 616 relative to the stator 618. In the latter case, where the smaller clearance causes an increased air pressure inside the air bearing chamber formed by guide rail 770, that increased pressure can be used to actuate the air supply throttle valve to increase air flow to increase the restoring force, and thus, maintain the air gap desired dimension.

During operation, when annular stator 618 is centered between rotors 614 and 616, the forces applied by the air bearings to each side of annular stator 618 are equal and opposite. When an external force causes annular rotor portions 614 and 616 to move or deflect, the proximity sensor can detect a change corresponding to a change in distance between the rotor portion and the stator, and can communicate the detected change to the system controller 787 that can change the forces exerted by the air bearings. For example, the system controller 787 can release a higher flow rate of compressed air to the air bearing on the side with the decreased gap or distance between the stator 618 and the rotor portion 614 or 616 such that an increased force is exerted on the adjacent rotor portion, and can release less compressed air to the air bearing on the side with the increased gap or distance between the stator 618 and the rotor portion 614 or 616 such that a decreased force is exerted on the adjacent rotor. The net resultant force is transmitted through the stationary outrigger 668 and to the stator support member 624, which can prevent or limit further movement of, or contact between, the annular rotor portions 614 or 616 and the annular stator 618, thus re-centering annular stator 618 between annular rotor portions 614 and 616 and minimizing variation of the air gap. Guide rails 770 can provide a backup, mechanical means for maintaining the desired air gap clearance. For example, if the air bearings fail, guide rails 770 function as shown and described for FIG. 18.

In an alternative embodiment, the air gap control system 710 functions as a passive system rather than an active system. In such an embodiment, the air gap control system 710 may not include a system controller 787 and a proximity sensor. During operation of such a system, when annular stator 618 is centered between rotors 614 and 616, the forces applied by the air bearings to each side of annular stator 618 are equal and opposite. When an external force causes annular rotor portions 614 and 616 to move or deflect, the forces exerted by the air bearings change as the air flow out of the bearing pocket formed by guide rail 770 is restricted. This restriction will increase the air pressure, which will increase the load capacity of the air bearing and enable it to exert a higher force. For example, the air bearing on the side with the decreased gap exerts an increased force on the adjacent annular rotor portion (614 or 616), while the air bearing on the side with the increased gap exerts a decreased force on the adjacent annular rotor portion (614 or 616). The net resultant force is transmitted through the stationary outrigger 668 and to the stator support member 624, which can prevent or limit further movement of, or contact between, the annular rotor portions 614 or 616 and the annular stator 618, thus re-centering annular stator 618 between annular rotor portions 614 and 616 and minimizing variation of the air gap. As described above, guide rails 770 can provide a backup, mechanical means for maintaining the necessary air gap clearance. For example, if the air bearings fail, guide rails 770 function as shown and described for FIG. 18.

FIG. 20 illustrates embodiment of an alternative air gap control system coupled to the rotor/stator assembly 612. In this embodiment, an air gap control system 810 is another example of an active system that includes proximity sensors to determine the distance between the rotor portions 614 and 616 and the stator 618, a controllable force generating device (in this embodiment, electromagnets) and a controller that varies the applied force based on input from the proximity sensors. Specifically, in this embodiment the rotor/stator assembly 612 includes rotor extensions 878 incorporated with or coupled to rotor portions 614 and 616. In alternative embodiments that utilize proximity sensors, rotor extensions 878 may not be included. Rotor extensions 878 can be formed, for example, of a ferromagnetic material, such as, for example, steel. Electromagnet assemblies 880 are coupled to the stationary outrigger 668 on each side of the stator 618. The electromagnet assemblies 880 can each include a proximity sensor 882 at least partially surrounded by two opposing pole pieces 884, and a coil 886 for magnetizing pole pieces 884, as shown in FIG. 21. The electromagnet assemblies 880 are disposed on stationary outrigger 668 such that the proximity sensor 882 faces the rotor extensions 878. A system controller 887 is coupled to and/or in communication with the electromagnet assemblies 880.

In operation, when a proximity sensor 882 detects a decrease in the distance to the rotor extension 878 corresponding to a distance between the rotor portion 614 or 616 and the stator 618 and compare that distance to a stored threshold distance. If the detected distance is less than the stored threshold distance, the system controller 887 can increase the strength of magnetism of the electromagnet assembly 880 such that a magnetic force is exerted on either the stator 618 or the rotor portion 614 or 616. Specifically, the system controller 887 can activate the coil 886 of the electromagnet assembly 880, thus magnetizing opposing pole pieces 884 and creating a magnetic attractive force between rotor extension 878 and stationary outrigger 668. The force is transmitted through the stator support structure 652, which can prevent or limit further movement of, or contact between, the annular rotor portions 614 or 616 and the annular stator 618 and act to re-center annular stator 618 between annular rotor portions 614 and 616 and minimize variation of the air gap. After the proximity sensor 882 detects that the desired air gap is restored, the system controller 887 deactivates coil 886. As with other embodiments, guide rails 870 can be included to provide a mechanical backup in case of failure of electromagnet assemblies 880. Although this embodiment was described as using magnet assemblies 880 having two opposing pole pieces 884, in alternative embodiments other types of electromagnets can be utilized.

Figure 22:
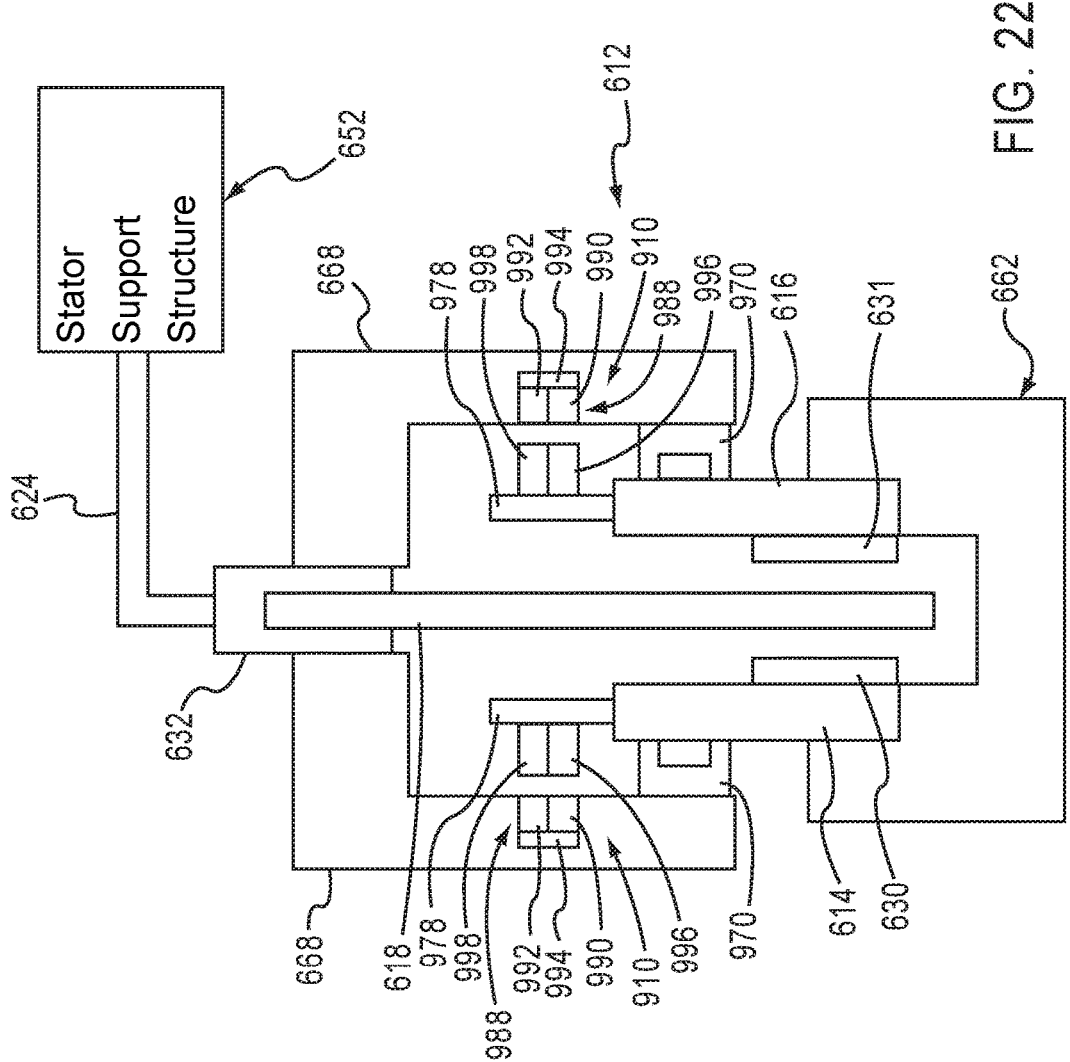
FIG. 22 is a schematic illustration of a portion of an axial rotor/stator assembly and a portion of an air gap control system, according to another embodiment.

FIG. 22 illustrates embodiment of another alternative air gap control system coupled to the rotor/stator assembly 612. In this embodiment, an air gap control system 910 includes magnets coupled to the stationary outrigger and to rotor extensions in a similar manner as described above for air gap control system 810. FIG. 22 illustrates the use of permanent magnets similar to those described with respect FIGS. 10-17. In this embodiment, magnet arrays 988 are coupled to the stationary outrigger 668 on each side of the stator 618. The magnet arrays 988 can include, for example, two permanent magnets 990 and 992 mounted on a ferromagnetic back iron 994 that are attached to an inward side of stationary outriggers 668. For example, a magnet array 988 can include a south pole permanent magnet 990 attached to the back iron 994 in a radial outside position, and a north pole permanent magnet 992 attached to the back iron 994 in a radial inside position. In addition, permanent magnets 996 and 998 are mounted on rotor extensions 978, directly opposite permanent magnets 990 and 992, respectively Permanent magnets 990, 992, 996, and 998 can be mounted such that there is a repulsive force between magnet pairs 990 and 996 and between magnet pairs 992 and 998, and this force can increase as the magnet pairs are brought closer together. In a nominal position, for example, where the annular stator 618 is centered between annular rotor portions 614 and 616, the repulsive forces between the magnet pairs on either side of the annular stator 618 are equal and opposite, resulting in no net force on the support members 624. When annular rotor portions 614 and 616 are displaced from the equilibrium position, however, there is an increased repulsive force between the magnet pairs on the side with a decreased air gap (i.e., the distance between the stator 618 and the rotor portion 614 or 616 is decreased) and a decreased repulsive force between the magnet pairs on the side with an increased air gap (i.e., the distance between the stator 618 and the rotor portion 614 or 616 is increased), with a net resultant force that deflects the support members 624 in a direction to re-center annular stator 618 between annular rotor portions 614 and 616. In an alternative embodiment, the magnet pairs can be disposed such that when there is increase in the distance between the rotor portions 614 or 616 and the stator 618 a magnetic attractive force is created between the magnet pairs on the side with an increased air gap. Here again, guide rails 970 can optionally be used to provide a backup air gap control system.

In alternative embodiments, an air gap control system can use a combination of permanent magnets and electromagnets rather than only permanent magnets or only electromagnets (as described for air gap control system 910). For example, in some embodiments, one or more electromagnets can be used on one side of the stator and one or more permanent magnets can be used on the other side of the stator. The number of magnets included in magnet arrays 988 can also vary.

Figure 23:
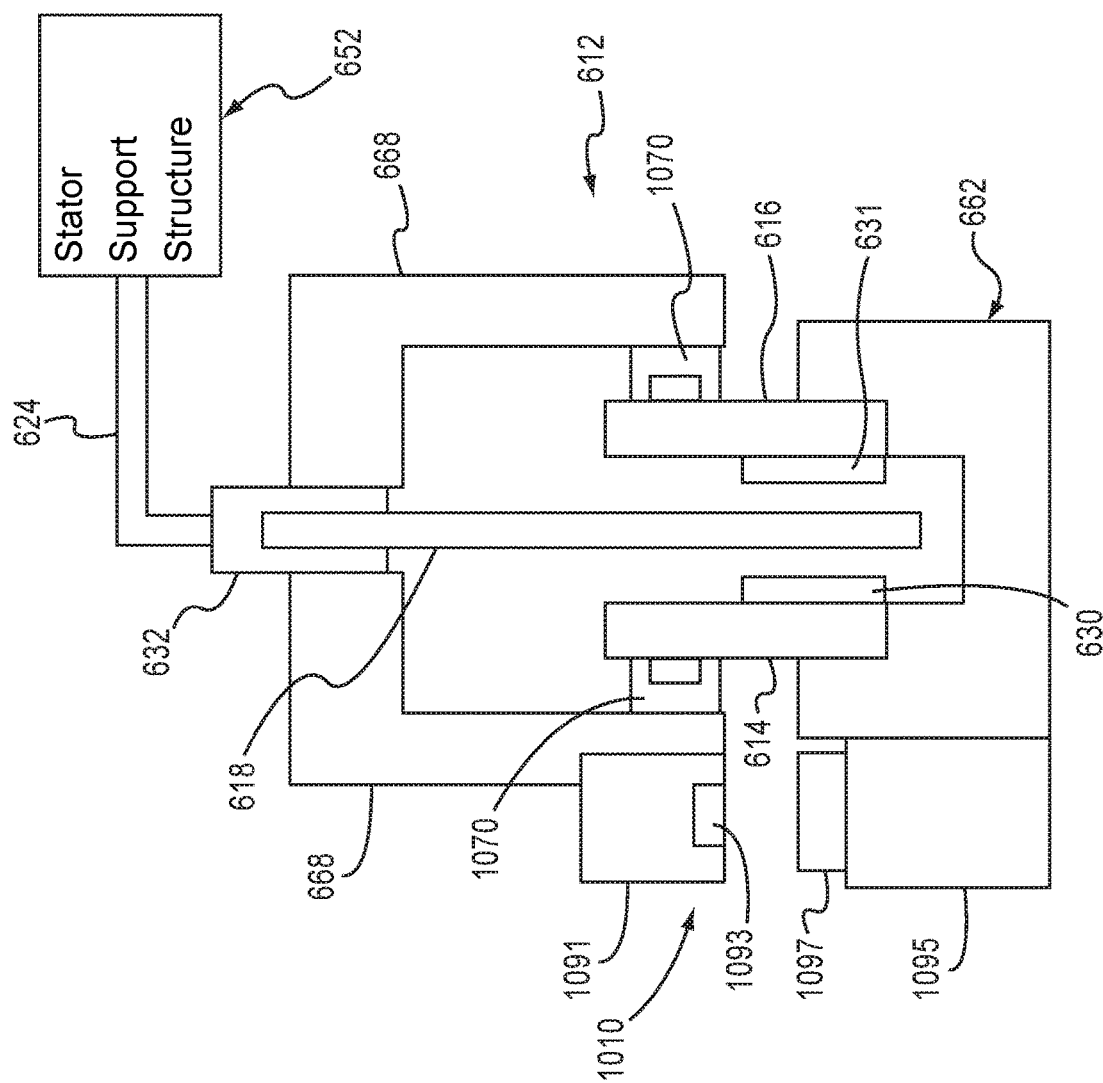
FIG. 23 is a schematic illustration of a portion of an axial rotor/stator assembly and a portion of an air gap control system, according to another embodiment.

FIG. 23 illustrates yet another embodiment of an air gap control system coupled to the rotor/stator assembly 612. In this embodiment, an air gap control system 1010 includes a non-ferromagnetic bracket 1091 attached to stationary outriggers 668 on one axial side of annular stator 618. In this example, the bracket 1091 is coupled to the side of the stator 618 adjacent the rotor portion 614. The non-ferromagnetic bracket 1091 can hold, for example, one two, or another quantity of annular rows of magnets 1093. The annular rows of magnets can be, for example, a Halbach or other array of magnets or magnets and pole pieces arranged to maximize the flux being passed through the null flux ladder circuit.

A rim extension 1095 of annular rotor portion 614 (or of annular rotor 616 if the non-ferromagnetic brackets 1091 is attached to stationary outriggers 668 on the same side as annular rotor portion 616), also made of non-ferromagnetic material, can support a null flux ladder circuit 1097. Null flax ladder circuits are also known to persons of ordinary skill in the art.

During operation, as annular rotor portion 614, and hence null flux ladder circuit 1097, rotates beneath annular rows of magnets 1093, no current flows through null flux ladder circuit 1097 as long as annular stator 618 remains in a nominal position (e.g., centered between annular rotor portions 614 and 616). If rotor portions 614 and 616 are moved or deflected by an external force, such that annular rows of magnets 1093 are no longer centered over null flux ladder circuit 1097, the magnetic flux from annular rows of magnets 1093 will cause current to flow through null flux ladder circuit 1097. This will in turn generate a repulsive magnetic field that pushes annular rows of magnets 1093, and the structure to which they are attached, back toward the center of null flux ladder circuit 1097. Because annular rows of magnets 1093 are fixed relative to annular stator 618, the centering effect created by the interaction of annular rows of magnets 1093 and null flux ladder circuit 1097 serves to keep annular stator 618 centered between annular rotor portions 614 and 616. Guide rails 1070 can optionally be used to provide a backup air gap control system in the event that the main system of this embodiment fails, and also to maintain the desired air gap when annular rotor portions 614 and 616 are stopped.

Figure 24:
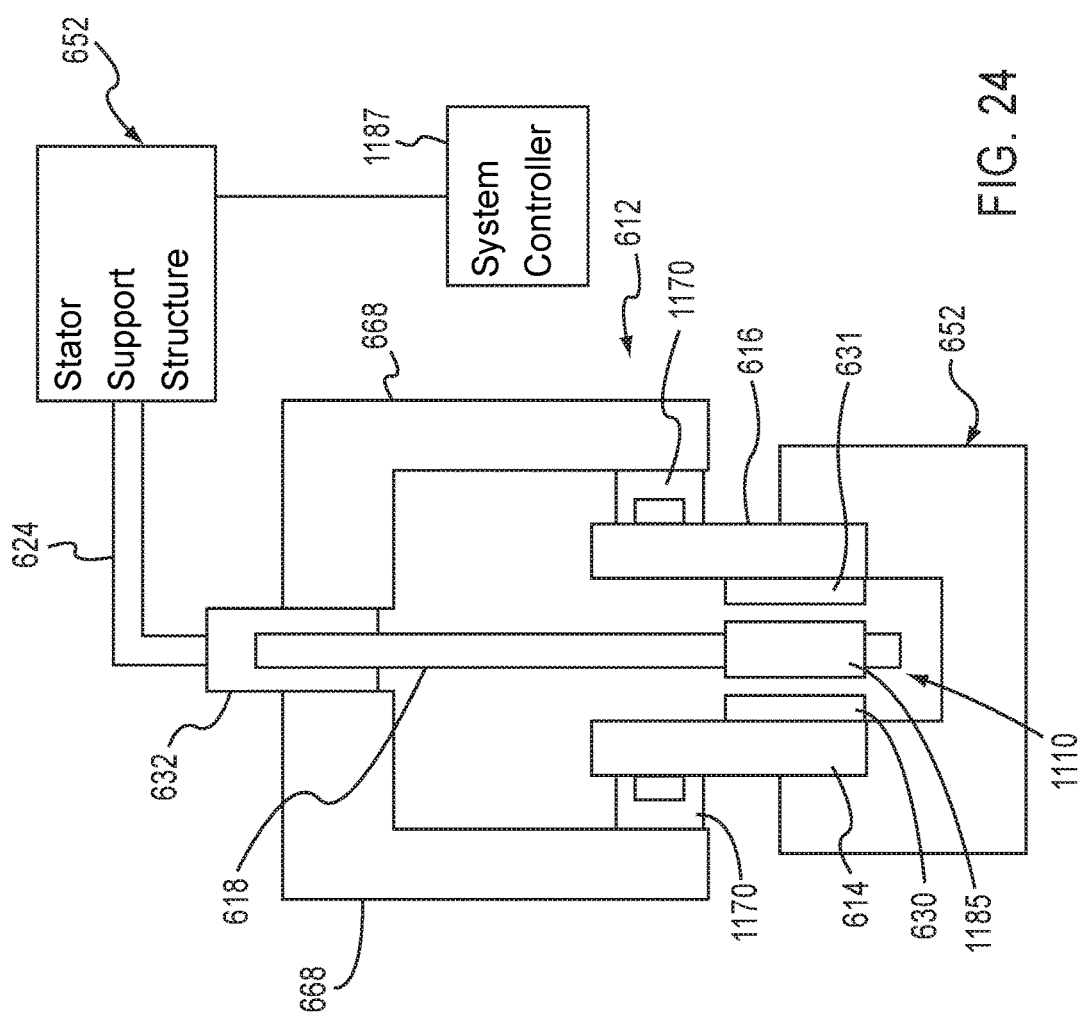
FIG. 24 is a schematic illustration of a portion of an axial rotor/stator assembly and a portion of an air gap control system, according to another embodiment.

FIG. 24 illustrates an air gap control system according to another embodiment. In this embodiment an air gap control system 1110 includes auxiliary windings 1185 on or near the outer surfaces of annular stator 618. For example, if annular stator 618 is formed of printed circuit boards as disclosed, for example, in U.S. Pat. No. 7,109,625 incorporated by reference above, then auxiliary windings 1185 can be included in the outer layers of annular stator 618, near annular rotor portions 614 and 616. Auxiliary windings 1185 can be in a different winding configuration that the primary windings on the stator 618, and can have a slightly different pole count than the primary windings in annular stator 618. Further, auxiliary windings 1185 can employ the same electrical segmentation scheme as the primary windings, so as to reduce complexity, or alternatively auxiliary windings 1185 on each printed circuit board may be electrically segmented.

In operation, a system controller 1187 can measure and compare the back-emf of each pair of auxiliary windings 1185 (i.e. the two auxiliary windings 1185 on opposite sides of a single printed circuit board). The auxiliary windings 1185 can be, for example, on a different flux path than the primary windings of the annular stator 618. If the measured back-emfs are equal, then annular stator 618 is centered between annular rotor portions 614 and 616. If the back-emfs are not equal, then the annular stator 618 is off-center. When this happens, the system controller 1187 sends alternating current to the auxiliary windings 1185 (and not the primary winding of the annular stator 618) on the side of the stator 618 with the relatively lower back-emf (the side of the stator 618 with a greater gap or distance between the rotor portion and the stator 618) to generate an attractive force that pulls annular stator 618 toward the rotor on the same side as the auxiliary windings 1185 being energized (i.e., to reduce the gap on that side). After annular stator 618 is centered, application of alternating current to the auxiliary winding 1185 is discontinued, such that it no longer generates a force between them. As with previous embodiments, guide rails 1170 may be optionally be used, both as a backup air gap control system, and to control the air gap when annular rotors 614 and 616 are stopped.

Figure 25:
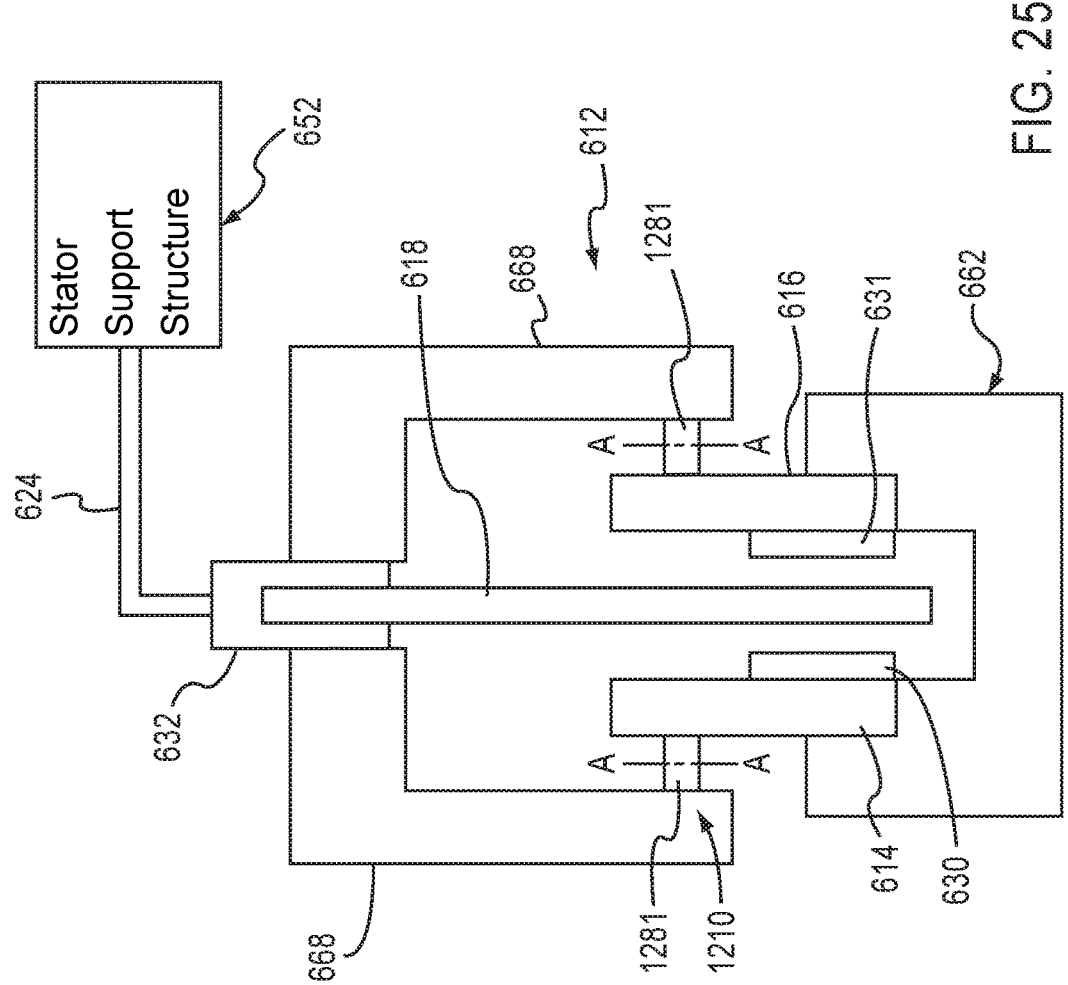
FIG. 25 is a schematic illustration of a portion of an axial rotor/stator assembly and a portion of an air gap control system, according to another embodiment.

FIG. 25 illustrates another embodiment of an air gap control system coupled to the rotor/stator assembly 612. In this embodiment, an air gap control system 1210 includes wheels or rollers 1281 that are rotatably attached to the stationary outriggers 668. Each wheel or roller 1281 can be aligned with its axis A-A in the radial direction relative to rotor/stator assembly 612. During operation, when an external force causes a deflection or movement of annular rotor portions 614 and 616, one of rotor portions 614 and 616 contacts one or more of the wheels or rollers 1281 and applies a force thereto. That force is transferred through the outriggers 668 and causes stator support members 624 to move or deflect to re-center annular stator 618 between annular rotor portions 614 and 616, and thereby maintain the desired air gap clearance between the stator 618 and the rotor portions 614 and 616.

Figure 26:
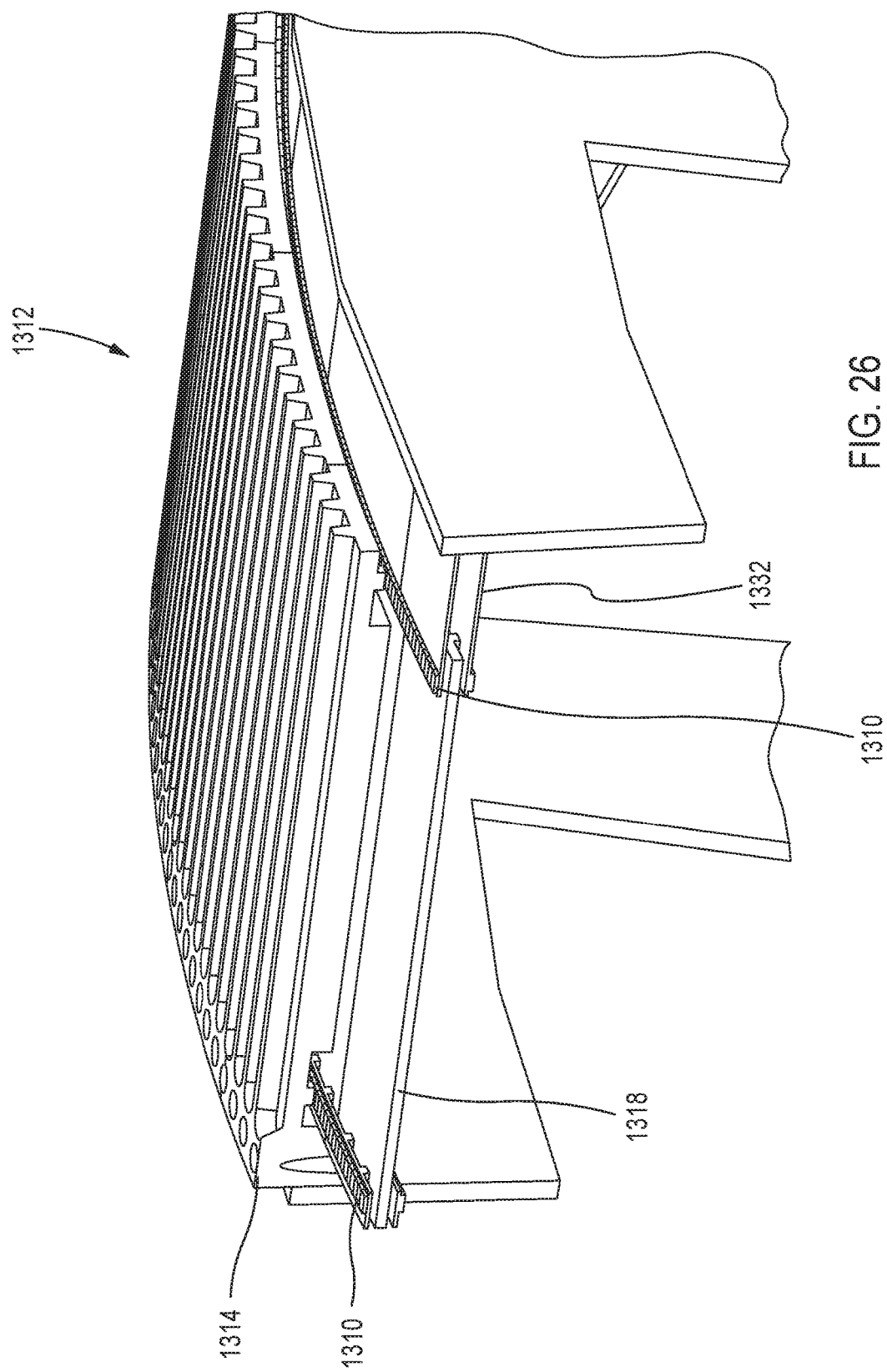
FIG. 26 is an illustration of a portion of a radial rotor/stator assembly and a portion of an air gap control system, according to another embodiment.

FIG. 26 is an illustration of a portion of a radial rotor/stator assembly 1312. The radial rotor/stator assembly 1312 includes a stator 1318 disposed between a first rotor portion 1314 and a second rotor portion (not shown). The stator 1318 is coupled to a stator support clamp 1332 which coupled the stator 1318 to stator support members 1324. The rotor portion 1314 can also be coupled to a rotor support structure (not shown) as described for previous embodiments. An air gap control system 1310 is coupled to the stator support clamp 1332 and the first rotor portion 1314 and includes an array of magnets, such as the magnet assemblies described with respect to FIGS. 10-17. In alternative embodiments, a radial rotor/stator system can include any of the various configurations of an air gap control system described herein.

Figure 27:
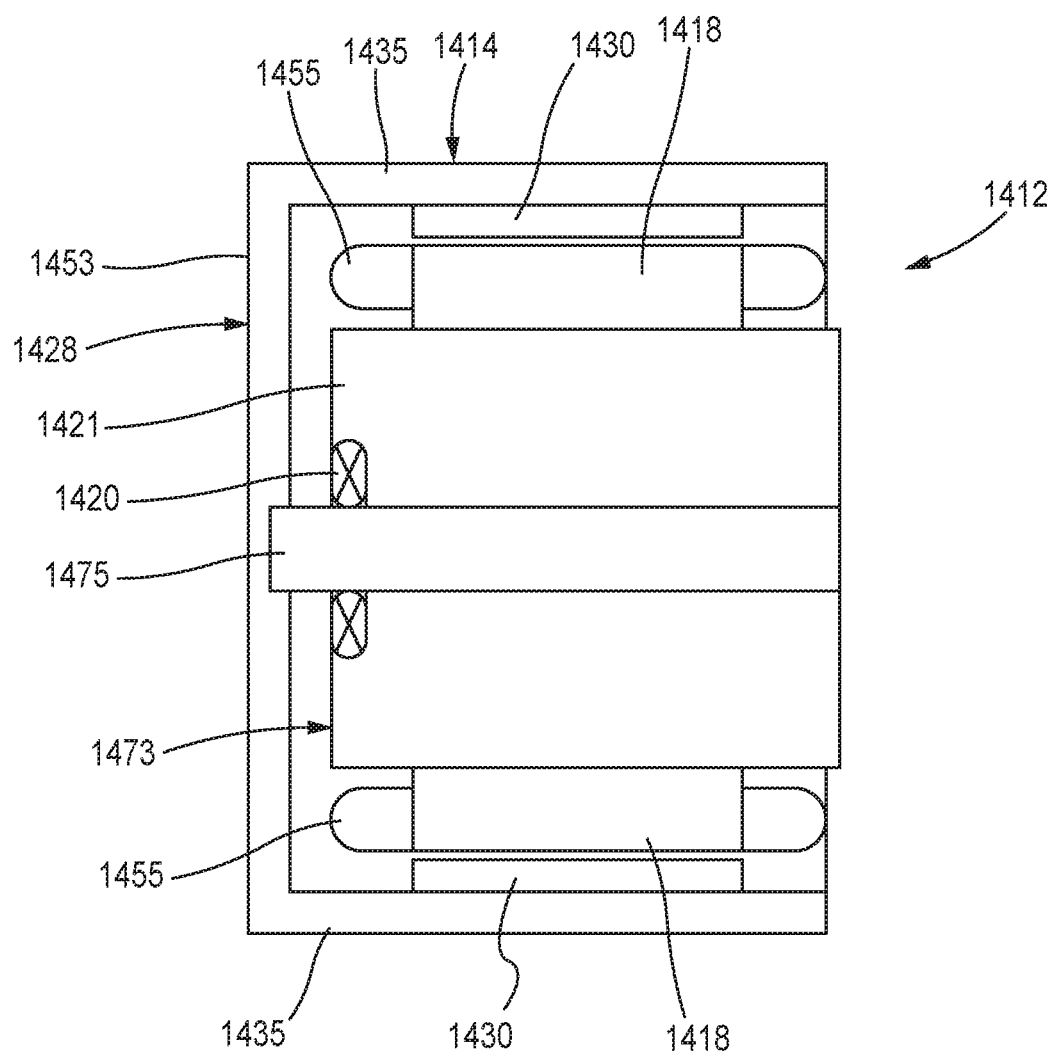
FIG. 27 is a schematic illustration of a cup-type radial flux rotor/stator assembly, according to an embodiment.
Figure 28:
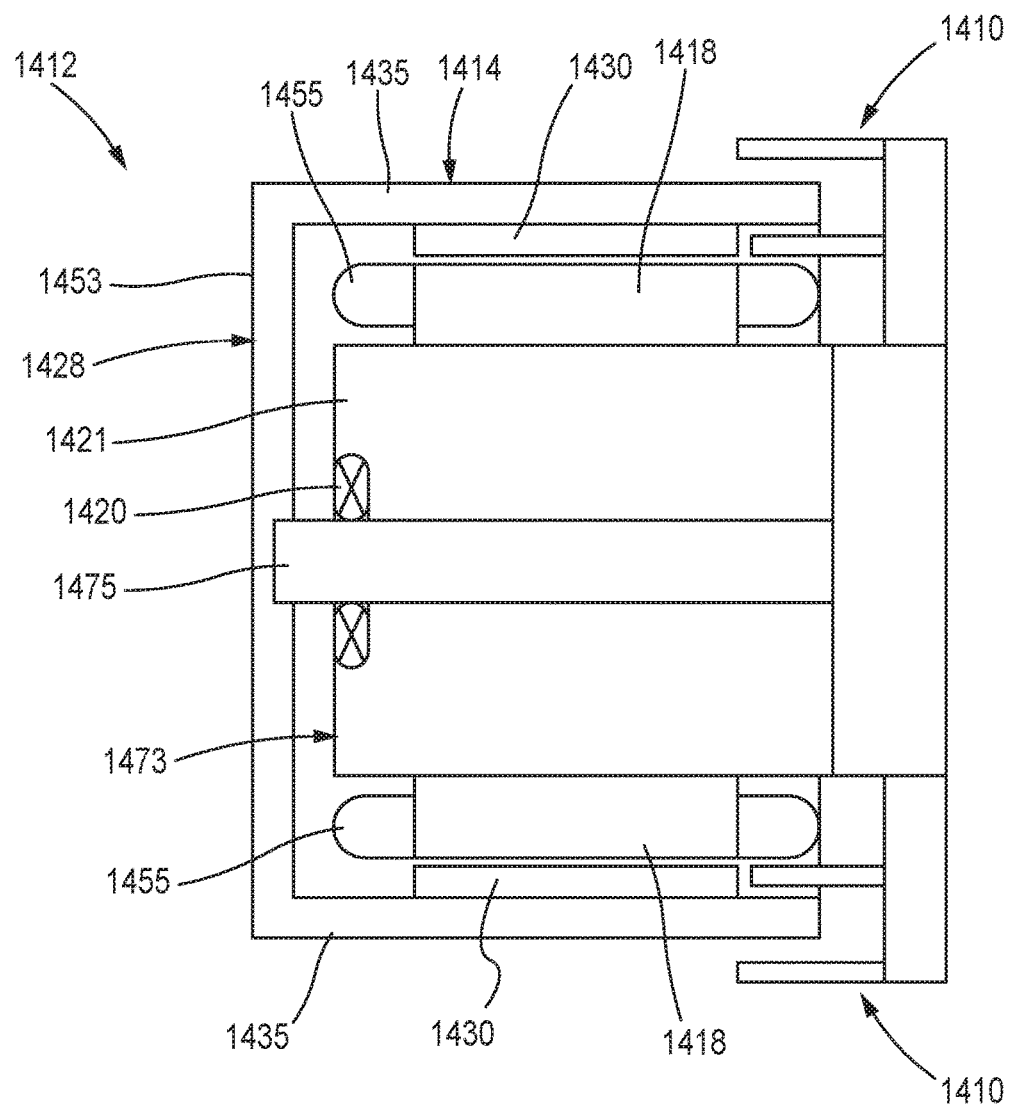
FIG. 28 is a schematic illustration of the rotor/stator assembly of FIG. 27 with an air gap control system coupled thereto.

FIGS. 27 and 28 are schematic illustrations of an embodiment of a cup-type radial flux rotor/stator assembly. A rotor/stator assembly 1412 includes a rotor assembly 1428, a stator 1418, and a stator support structure 1473. In this embodiment, the rotor assembly 1428 is disposed for rotational movement relative to the stator 1418. The stator support structure 1473 supports the stator 1418 and includes a main bearing 1420 and a stator hub 1421 and can include other support components not shown in FIGS. 27 and 28.

The rotor assembly 1428 includes a cylindrical portion 1414 and an end support portion 1453 that collectively form a cup shape. The cylindrical portion 1414 supports a cylindrical array of magnets 1430. The array of magnets 1430 can be coupled to a rotor back iron 1435 of the rotor assembly 1428. The array of magnets 1430 can be the same as or similar to, and function the same as or similar to, for example, the magnets 30 and 31 described above with respect to FIG. 2. End support portion 1453 is coupled to one end of a rotating axle 1475, which is supported in a bearing 1420 and extends through a central opening of the stator hub 1421. Bearing 1420 can be the same as or similar to, and function the same as or similar to, the main bearing 20 and other bearings described herein. For example, the bearing 1420 can support axle 1475 for rotational movement of the rotor assembly 1428 relative to the stator 1418.

The end of the cylindrical portion 1414 opposite the end support portion 1453 is unsupported or open. A diameter and/or length of the rotor assembly 1428 can be configured with a desired mass to achieve a desired stiffness of the rotor assembly 1428 and support structure 1473 that will resist attractive (radial in this depiction) forces between the rotor magnets 1430 and the stator 1418.

The stator 1418 can include the same features and perform the same functions as described above for previous embodiments. For example, the stator 1418 includes a plurality of cores, e.g. ferromagnetic cores as described above with reference to FIG. 6, distributed about the cylindrical outer surface of stator 1418, around each of which is wound a conductive winding 1455. The rotor/stator support structure 1473 can also include, for example, a stator support clamp (not shown) and stator support members (not shown) that can couple the stator 1418 to the stator hub 1421. As shown in FIG. 27, the stator 1418 is disposed within an interior of the cylindrical portion 1414 of rotor assembly 1428. For example, the stator 1418 can be centered or substantially centered concentrically within the cylindrical portion 1414.

In this embodiment, the unsupported end of the rotor assembly 1428 can respond to varying electromagnetic forces from the geometry of the rotor assembly 1428 and the stator 1418 by vibrating. For example, vibration modes of concern that can cause either "breathing modes" in which the cylindrical portion of the rotor assembly 1428 begins to deform and become lobed in a radial direction, and/or the rotor assembly 1428 deflects a support membrane at the connection to the main bearing 1420 and the open end of the rotor assembly 1428 becomes closer to the stator 1418 on one side than on the other side of the stator 1418 as the rotor assembly 1428 rotates. Adding a contacting or non-contacting, active or passive, air gap control system as described herein at the open end of the cup-type rotor assembly 1428 can eliminate or mitigate the effects of vibration to enable greater lengths and diameters for such machines, which is desirable to achieve higher torque and power ratings As shown in FIG. 28, an air gap control system 1410 can be coupled to the stator 1418 and/or the rotor assembly 1428 and used to control and/or maintain a desired air gap(s) defined between the stator 1418 and the rotor assembly 1428. The air gap control system 1410 can be any of the various configurations for an air gap control system described herein and can be coupled to the rotor/stator assembly 1412 at various locations (other than the location shown in FIG. 28). As described above for previous embodiments, during operation of the rotor/stator assembly 1412 if there is relative movement or deflection of the stator 1418 with respect to the cylindrical rotor portion 1414, the air gap control system 1410 can induce a centering force that acts to move the stator 1418 to a centered or substantially centered location within the cylindrical portion 1414. For example, if cylindrical portion 1414 is moved or deflected by an external loading or inertial acceleration, air gap control assembly 1410 can exert a force on stator 1418, causing stator 1418 to maintain a nominal location, for example, centered within cylindrical portion 1414.

Figure 29:
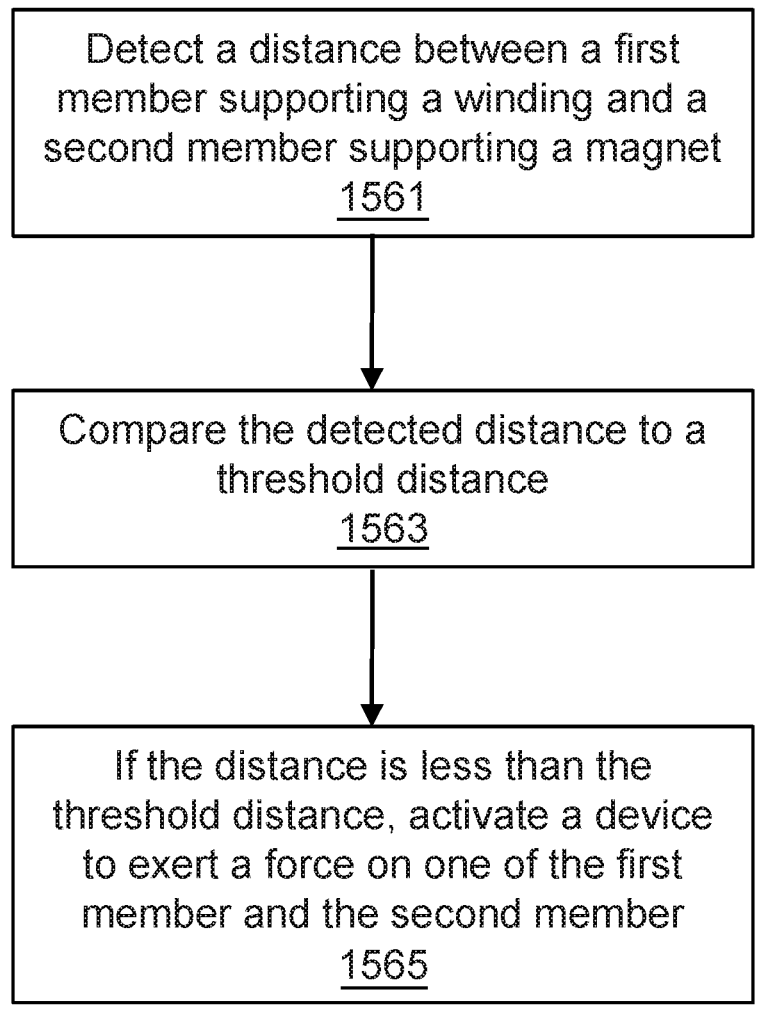
FIG. 29 is a flowchart illustrating a method of controlling an air gap, according to an embodiment.

FIG. 29 is a flowchart illustrating a method of controlling an air gap according to an embodiment. The method includes at 1561, detecting a distance between a first member supporting a winding and a second member supporting a magnet. The second member is disposed at a non-zero distance from the first member and configured to move relative to the first member. At 1563 the detected distance is compared to a threshold distance. At 1565, if the detected distance is less than the threshold distance, an air gap control device coupled to one of the first member or the second member is activated such that a force is exerted on one of the first member and the second member and the distance between the first member and the second member is increased. The air gap control device can be, for example, a separate component from the first flux generating member and the second flux generating member.

In some embodiments, activating the device includes increasing a strength of magnetism of an electromagnet disposed at least partially between a portion of the first member and a portion of the second member is increased such that a magnetic force is exerted on one of the first member and the second member by the electromagnet and the distance between the first member and the second member is increased. In some embodiments, activating the device includes sending an alternating current to an auxiliary winding coupled to the first member such that an attractive force is generated that causes the first member to be moved toward the second member and the distance between the first member and the second member is increased.

While the embodiments described above illustrate the use of various configurations for maintaining an air gap or distance between a rotor and a stator, at either the inner circumference or the outer circumference of the stator, other variations are possible. For example, an air gap control system can be implemented at both the inner circumference and the outer circumference of the stator. An air gap control system can be implemented at a variety of different locations as illustrated and described, for example, with respect to FIGS. 3-6. In addition, an air gap control system can be implemented to control an air gap in both a two-sided rotor system and a one-sided rotor system (see e.g., FIG. 6). For example, as described herein, for a two-sided rotor system, the air gap control system can control and maintain the stator in a centered position between the first rotor portion and the second rotor portion. In a one-sided system the air gap control system can control and maintain the stator at a minimum distance from the rotor.

Air gap control systems as described herein can be used in electromagnetic machines of many varieties, including axial, radial, and transverse flux electromagnetic machines, and in machines utilizing axial, radial, or linear motion. For example, an air gap control system may be used in electromagnetic machines having a stator with a freely suspended outer circumference, a freely suspended inner circumference, or a fixed inner and outer circumference. An air gap control system as described herein can be used in any machine in which a desired gap or distance between a stationary component and a component the moves relative to the stationary component is desired.

The system controllers 787, 887 and 1187 described herein can each include the use of a computer or computers. As used herein, the term computer is intended to be broadly interpreted to include a variety of systems and devices including personal computers, laptop computers, mainframe computers, set top boxes, digital versatile disc (DVD) players, and the like. A computer can include for example, processors, memory components for storing data (e.g., read only memory (ROM) and/or random access memory (RAM), other storage devices, various input/output communication devices and/or modules for network interface capabilities, etc. Various functions of the rotor/stator assemblies and/or air gap control systems described herein can be performed by software and/or hardware.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the systems, apparatus and/or methods described herein may be combined in any combination, except mutually exclusive combinations. The embodiments described herein can include various combinations and/or sub-combinations of the functions, components and/or features of the different embodiments described. For example, although a system controller is described with reference to certain embodiments, a system controller can be included in any of the embodiments of an air gap control system described herein. In another example, although specific types and quantities of magnets are described with reference to specific embodiments, it should be understood that other types and quantities of magnets can alternatively be used. In addition, a machine (e.g., a rotor/stator assembly) can utilize any combination of applications of an air gap control system within the machine.

We claim:

1. An apparatus, comprising:
a first member supporting a magnetic flux carrying member;
a second member supporting a magnetic flux generating member, the second member disposed for movement relative to the first member, the second member having a first portion and a second portion;
an air gap control device including a first magnet coupled to the first member and a second magnet coupled to the second member between the second member and the first magnet, the first magnet having a polarity in a first direction and the second magnet having a polarity in a second, opposite direction than the first direction, a repulsive force between the first magnet and the second magnet increases when a distance between the first member and the second member is decreased to exert a force on one of the first member and the first portion of the second member in response to relative movement of the first member and the second member in a direction that reduces a distance between the first member and the first portion of the second member to maintain a minimum distance between the first member and the first portion of the second member, the first magnet and the second magnet of the air gap control device forming a magnetic flux circuit separate from a primary magnetic flux circuit formed between the first member and the second member;
the air gap control device including a third magnet coupled to the first member on an opposite side of the first member than the first magnet; and
a fourth magnet coupled to the second portion of the second member and disposed between the second portion of the second member and the third magnet, the third magnet having a polarity in a third direction and the fourth magnet having a polarity in a fourth, opposite direction than the third direction, a repulsive force between the third magnet and the fourth magnet increases when a distance between the first member and the second portion of the second member is decreased to exert a force on one of the first member and the second portion of the second member in response to relative movement of the first member and the second portion of the second member in a direction that reduces a distance between the first member and the second portion of the second member to maintain a minimum distance between the first member and the second portion of the second member, the third magnet and the fourth magnet of the air gap control device forming a magnetic flux circuit separate from the primary magnetic flux circuit formed between the first member and the second member.

2. The apparatus of claim 1, wherein the first member is a stator and the magnetic flux carrying member is a winding and the second member is a rotor and the magnetic flux generating member includes a magnet.

3. The apparatus of claim 1, wherein the second member is disposed for rotational movement relative to the first member.

4. The apparatus of claim 1, wherein the second member is disposed for linear movement relative to the first member.

5. The apparatus of claim 1, wherein each of the first magnet and the second magnet is a permanent magnet.

6. The apparatus of claim 1, wherein the second member is disposed for rotational movement relative to the first member about an axis of rotation parallel to the direction of the distance between the first magnet and the second magnet.

7. An apparatus, comprising:
a stator coupled to a stator support structure, the stator supporting a magnetic flux carrying member;
a rotor disposed for rotational movement relative to the stator, the rotor having a first rotor portion and a second rotor portion, the second rotor portion being disposed parallel to the first rotor portion and supporting a magnetic flux generating member, the stator being disposed between the first rotor portion and the second rotor portion;
a first magnet coupled to the stator;
a second magnet coupled to the first rotor portion and disposed between the first rotor portion and the first magnet such that a gap is defined between the second magnet and the first magnet in a direction parallel to an axis of rotation of the rotor relative to the stator, the first magnet having a polarity in a first direction and the second magnet having a polarity in a second opposite direction such that a repulsive force is exerted on the stator between the first magnet and the second magnet in a direction that increases when a distance between the stator and the first rotor portion in a direction parallel to the axis of rotation of the rotor is decreased;
a third magnet coupled to the stator on an opposite side of the stator than the first magnet; and
a fourth magnet coupled to the second rotor portion and disposed between the second rotor portion and the third magnet such that a gap is defined between the fourth magnet and the third magnet in a direction parallel to an axis of rotation of the rotor relative to the stator, the third magnet having a polarity in a first direction and the fourth magnet having a polarity in a second opposite direction such that a repulsive force is exerted on the stator between the third magnet and the fourth magnet in a direction that increases when a distance between the stator and the second rotor portion in a direction parallel to the axis of rotation of the rotor is decreased.

8. The apparatus of claim 7, wherein the repulsive force exerted on the stator is configured to maintain the stator substantially centered between the first rotor portion and the second rotor portion.

9. The apparatus of claim 7, wherein each of the first magnet and the second magnet is a permanent magnet.

10. The apparatus of claim 7, wherein the first magnet and the second magnet form a magnetic flux circuit separate from a primary magnetic flux circuit formed between the magnetic flux carrying member and the magnetic flux generating member.

11. The apparatus of claim 7, wherein each of the third magnet and the fourth magnet is a permanent magnet.

12. The apparatus of claim 7, wherein the third magnet and the fourth magnet form a magnetic flux circuit separate from a primary magnetic flux circuit formed between the magnetic flux carrying member and the magnetic flux generating member.

\* \* \* \* \*